US006889312B1

(12) United States Patent
McGrath et al.

(10) Patent No.: US 6,889,312 B1
(45) Date of Patent: May 3, 2005

(54) SELECTIVE ZERO EXTENSION BASED ON OPERAND SIZE

(75) Inventors: Kevin J. McGrath, Los Gatos, CA (US); Ramsey W. Haddad, Cupertino, CA (US); Bruce R. Holloway, Boulder Creek, CA (US); I-Cheng K. Chen, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 629 days.

(21) Appl. No.: 09/824,869

(22) Filed: Apr. 2, 2001

Related U.S. Application Data

(60) Provisional application No. 60/224,368, filed on Aug. 9, 2000.

(51) Int. Cl.⁷ .................................................. G06F 9/30
(52) U.S. Cl. ........................................ 712/210; 712/229
(58) Field of Search ................................. 712/210, 221, 712/229

(56) References Cited

U.S. PATENT DOCUMENTS

| | | | | |
|---|---|---|---|---|
| 4,868,740 A | | 9/1989 | Kagimasa et al. ............. 711/2 |
| 5,091,853 A | * | 2/1992 | Watanabe et al. | |
| 5,227,989 A | * | 7/1993 | Jones, Jr. et al. | |
| 5,420,992 A | * | 5/1995 | Killian et al. | |
| 5,758,195 A | | 5/1998 | Balmer | |
| 5,907,694 A | * | 5/1999 | Suzuki et al. | |

OTHER PUBLICATIONS

John L. Hennessy and David A. Patterson; Computer Architecture a Quantitative Approach; 1990; Morgan Kaufman Publishers, Inc.; 4th printing; p. 580.*
The Authoritative Dictionary of IEEE Standards Terms; 2000; IEEE Press; 7th Edition; p. 701.*
*Intel Architecture Software Developer's Manual, vol. 1: Basic Architecture*, Intel® Corporation, 1997, Chapter 3, pp. 5–7.

*PowerPC™ Microprocessor Developer'Guide*, © 1995 by Sams Publishing, pp. 42–44, 59–61.
*The Technology Behind Crusoe™ Processors, Low–Power x86–Compatible Processors Implemented with Code Morphing™ Software*, Transmeta Corporation, Jan. 2000, pp. 1–18.
*Alpha Learns to Do Windows; Digital's FX!32 is The Key To Running Win32 Software on Alpha/Windows NT.*, Selinda Chiquoine, BYTE, Aug. 4, 1998, 4 pages.
*Awards Stack Up for DIGITAL FX!32 Windows Compatibility Software for ALPHA*, Digital Press Releases, Dec. 11, 199 7, 7 pages.
*DIGITAL FX!32; White Paper: How DIGITAL FX!32 Works*, DIGITAL Semiconductor, Jan. 26, 1998, 4 pages.
*An Alpha in PC Clothing: Digital Equipment's New x86 Emulator Technology Makes An Alpha System a Fast x86 Clone*Tom Thompson, BYTE, Aug. 4, 1998, 7 pages.
*ADM 64–Bit Technology; The AMD x86 Architecture Programmers Overview*, AMD, Publication #24108 Rev: A, Aug. 2000, pp. 1–106.
*AMD 64–Bit Technology; The AMD x86–64 Architecture Programmers Overview*, AMD, Pulication #24108 Rev: C, Jan. 2001, pp. 1–128.
Office Action mailed Jun. 18, 2003 from U.S. Appl. No. 09/596,867, 8 pages.

* cited by examiner

*Primary Examiner*—Eddie Chan
*Assistant Examiner*—Shane Gerstl
(74) *Attorney, Agent, or Firm*—Lawrence J. Merkel; Meyertons, Hood, Kivlin, Kowert & Goetzel, P.C.

(57) ABSTRACT

A processor supports multiple operand sizes (e.g. 8, 16, 32, and 64 bit operand sizes, in one embodiment). Additionally, the processor determines how to update a destination register when an operand size less than the largest operand size is used. In one embodiment, the processor determines whether or not to zero extend the result responsive to the operand size used. In one particular embodiment, the processor zero extends 32 bit operands and does not zero extend 8 or 16 bit operands. Furthermore, the processor may preserve the value in at least part of the remaining portion of the register when 8 or 16 bit operand sizes are used.

28 Claims, 16 Drawing Sheets

| LME | CS L Bit | CS D Bit | Operating Mode |
|---|---|---|---|
| 0 | x | 0 | 16 Bit Mode |
| 0 | x | 1 | 32 Bit Mode |
| 1 | 0 | 0 | 16 Bit Compatibility Mode |
| 1 | 0 | 1 | 32 Bit Compatibility Mode |
| 1 | 1 | 0 | 32/64 Mode |
| 1 | 1 | 1 | Reserved |

70 ↗

| LME | CS L Bit | CS D Bit | Operating Mode |
|---|---|---|---|
| 0 | x | 0 | 16 Bit Mode |
| 0 | x | 1 | 32 Bit Mode |
| 1 | 0 | 0 | 16 Bit Compatibility Mode |
| 1 | 0 | 1 | 32 Bit Compatibility Mode |
| 1 | 1 | 0 | 32/64 Mode |
| 1 | 1 | 1 | Reserved |

70

SELECTIVE ZERO EXTENSION BASED ON OPERAND SIZE

This application claims benefit of priority to Provisional Application Ser. No. 60/224,368 filed Aug. 9, 2000.

BACKGROUND OF THE INVENTION

1. Field of the Invention

This invention is related to the field of processors and, more particularly, to zero extension of instruction execution results within processors.

2. Description of the Related Art

The x86 architecture (also known as the IA-32 architecture) has enjoyed widespread acceptance and success in the marketplace. Accordingly, it is advantageous to design processors according to the x86 architecture. Such processors may benefit from the large body of software written to the x86 architecture (since such processors may execute the software and thus computer systems employing the processors may enjoy increased acceptance in the market due to the large amount of available software).

As computer systems have continued to evolve, 64 bit address size and operand size has become desirable. A larger address size allows for programs having a larger memory footprint (the amount of memory occupied by the instructions in the program and the data operated upon by the program) to operate within the memory space. A larger operand size allows for operating upon larger operands, or for more precision in operands. More powerful applications and/or operating systems may be possible using 64 bit address and/or operand sizes.

Unfortunately, the current x86 architecture is limited to a maximum 32 bit operand size and 32 bit address size. The operand size refers to the number of bits operated upon by the processor (e.g. the number of bits in a source or destination operand). The address size refers to the number of bits in an address generated by the processor. Thus, processors employing the x86 architecture may not serve the needs of applications which may benefit from 64 bit address or operand sizes.

An additional problem which may be encountered in attempting to provide a 64 bit operand size in an x86 compatible processor arises from the multiple operand sizes supported by the x86 architecture. More particularly, the current x86 architecture supports operand sizes of 8, 16, and 32 bits. Instructions having different operand sizes may be freely intermixed in a code sequence. Furthermore, the destinations of the instructions may be the same architected registers, even though the operand sizes are different. Thus, a first instruction having one operand size may update a register which provides a source operand for a second instruction having a different operand size. If the operand size of the second instruction is larger than the operand size of the first instruction, a definition of the source operand provided to the second instruction is needed. This problem is further compounded by the addition of a 64 bit operand size.

SUMMARY OF THE INVENTION

The problems outlined above are in large part solved by a processor as described herein. The processor supports multiple operand sizes (e.g. 8, 16, 32, and 64 bit operand sizes, in one embodiment). Additionally, the processor determines how to update a destination register when an operand size less than the largest operand size is used. In one embodiment, the processor selectively zero extends the result responsive to the operand size used. In one particular embodiment, the processor zero extends 32 bit results and does not zero extend 8 or 16 bit results. Furthermore, the processor may preserve the value in at least part of the remaining portion of the register when 8 or 16 bit operand sizes are used. Thus, the contents of the destination register may be defined even when the operand size is not the full size of the register.

In one embodiment, zero extending 32 bit results may provide for increased performance of 32 bit operations in the processor. The processor may read the previous value of a destination register of an instruction if the destination register is not being updated in its entirety. The previous value of the non-updated portion may be merged with the result generated by the instruction, and the merged value may be stored in the destination register (which may eliminate hardware for performing partial register updates, e.g. write enables on a register file). Thus, in this embodiment, the processor may experience a dependency on the destination register, even if the destination register is not also a source register for the instruction (e.g., for a load instruction). By zero extending 32 bit results, the entirety of the 64 bit destination register may be updated and thus no read of the destination register prior to executing the instruction may be required for 32 bit operations. Since 32 bit operations may be expected to dominate in typical code, the performance increase may be substantial.

Broadly speaking, a processor is contemplated, comprising a register and an execution core coupled to the register. The execution core is configured to execute an instruction to produce a result, and the instruction has the register as a destination. The execution core is configured to selectively zero extend the result for update in the register responsive to an operand size corresponding to the instruction.

Moreover, a method is contemplated. An instruction is executed to produce a result. The instruction has a register as a destination. The result is selectively zero extended for update in the register responsive to an operand size corresponding to the instruction.

BRIEF DESCRIPTION OF THE DRAWINGS

Other objects and advantages of the invention will become apparent upon reading the following detailed description and upon reference to the accompanying drawings in which.

Figure 1:
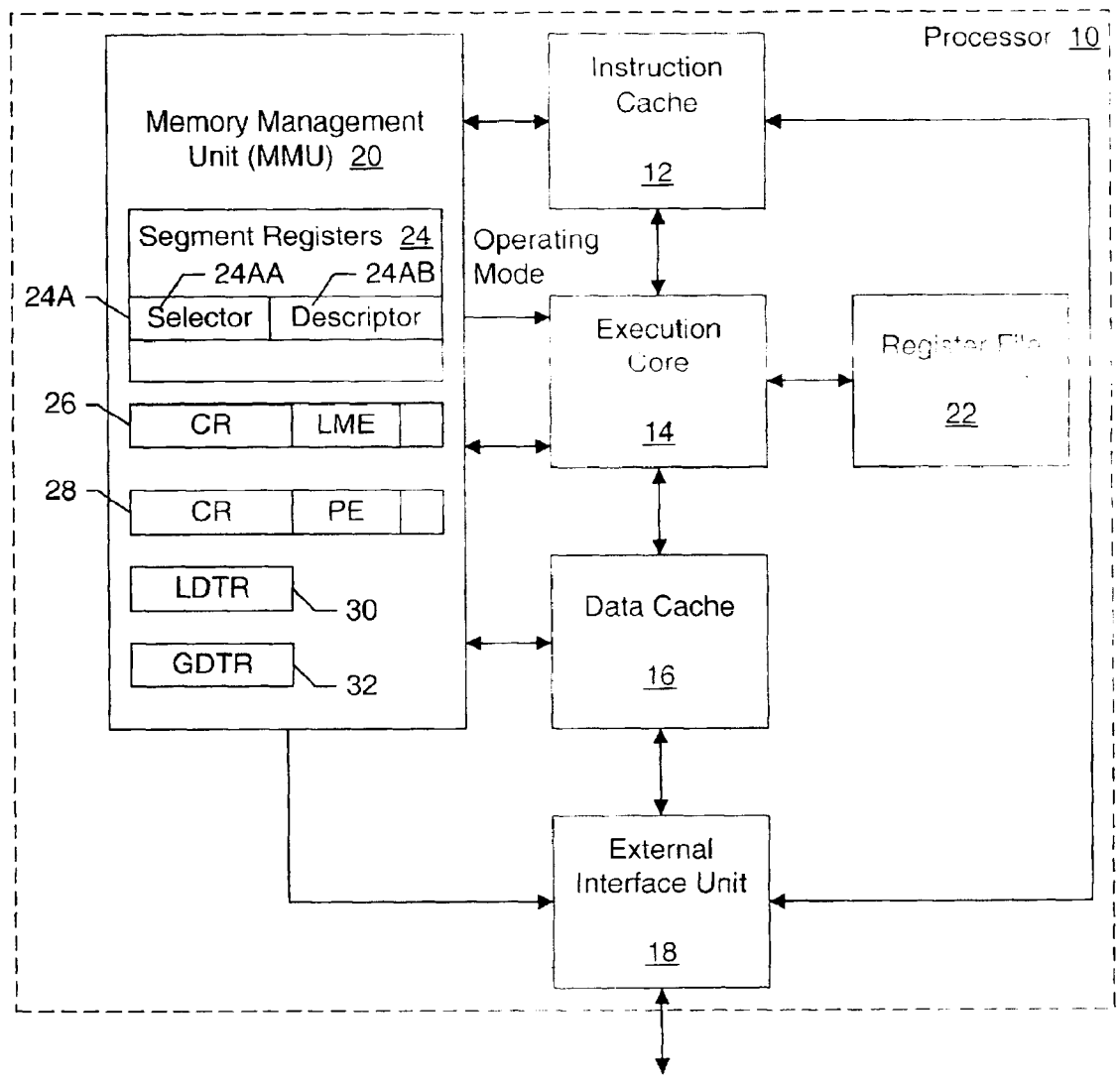
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram illustrating one embodiment of a processor 10 is shown. Other embodiments are possible and contemplated. In the embodiment of FIG. 1, processor 10 includes an instruction cache 12, an execution core 14, a data cache 16, an external interface unit 18, a memory management unit (MMU) 20, and a register file 22. In the illustrated embodiment, MMU 20 includes a set of segment registers 24, a first control register 26, a second control register 28, a local descriptor table register (LDTR) 30, and a global descriptor table register (GDTR) 32. Instruction cache 12 is coupled to external interface unit 18, execution core 14, and MMU 20. Execution core 14 is further coupled to MMU 20, register file 22, and data cache 16. Data cache 16 is further coupled to MMU 20 and external interface unit 18. External interface unit 18 is further coupled to 20 and to an external interface.

Processor 10 may employ a processor architecture compatible with the x86 architecture and including additional architectural features to support 64 bit processing. Processor 10 is configured to establish an operating mode in response to information stored in a code segment descriptor corresponding to the currently executing code and further in response to one or more enable indications stored in one or more control registers. As used herein, an "operating mode" specifies default values for various programmably selectable processor attributes. For example, the operating mode may specify a default operand size and a default address size. The default operand size specifies the number of bits in an operand of an instruction, unless an instruction's encoding overrides the default. The default address size specifies the number of bits in an address of a memory operand of an instruction, unless an instruction's encoding overrides the default. The default address size specifies the size of at least the virtual address of memory operands, and may also specify the size of the physical address. Alternatively, the size of the physical address may be independent of the default address size and may instead be dependent on the LME bit described below (e.g. the physical address may be 32 bits if the LME bit is clear and an implementation-dependent size greater than 32 bits and less than 64 bits if the LME bit is set) or on another control bit (e.g. the physical address extension bit, or PAE bit, in another control register). As used herein, a "virtual address" is an address generated prior to translation through an address translation mechanism (e.g. a paging mechanism) to a "physical address", which is the address actually used to access a memory. Additionally, as used herein, a "segment descriptor" is a data structure created by software and used by the processor to define access control and status for a segment of memory. A "segment descriptor table" is a table in memory having multiple entries, each entry capable of storing a segment descriptor.

In the illustrated embodiment, MMU 20 generates an operating mode and conveys the operating mode to execution core 14. Execution core 14 executes instructions using to the operating mode. More particularly, execution core 14 may fetch operands having the default operand size from register file 22 or memory (through data cache 16, if the memory operands are cacheable and hit therein, or through external interface unit 18 if the memory operands are noncacheable or miss data cache 16) unless a particular instruction's encoding overrides the default operand size, in which case the overriding operand size is used. Execution core 14 updates destination operands having the default operand size unless a particular instruction's encoding overrides the default operand size, in which case the overriding operand size is used (e.g. execution core 14 may modify only a portion of the destination register, the portion being specified by the operand size). Similarly, execution core 14 generates addresses of memory operands, wherein the addresses have the default address size unless a particular instruction's encoding overrides the default address size, in which case the overriding address size is used. In other embodiments, the information used to generate the operating mode may be shadowed locally in the portions of processor 10 which use the operating mode (e.g. execution core 14), and the operating mode may be determined from the local shadow copies.

As mentioned above, MMU 20 generates the operating mode responsive to a code segment descriptor corresponding to the code being executed and further responsive to one or more values in control registers. Information from the code segment descriptor is stored in one of the segment registers 24 (a register referred to as CS, or code segment). Additionally, control register 26 stores an enable indication (LME) which is used to enable an operating mode in which the default address size is greater than 32 bits ("32/64 mode") as well as certain compatibility modes for the 32 bit and 16 bit operating modes. The default operand size may be 32 bits in 32/64 mode, but instructions may override the default 32 bit operand size with a 64 bit operand size when desired. If the LME indication is in an enabled state, then 32/64 mode may be used in addition to 32 bit and 16 bit modes. If the LME indication is in a disabled state, then 32/64 mode is disabled. In one embodiment, the default address size in 32/64 mode may be implementation-dependent but may be any value up to and including 64 bits. Furthermore, the size of the virtual address may differ in a given implementation from the size of the physical address in that implementation.

It is noted that enable indications may be described herein as bits with the enabled state being the set state of the bit and the disabled state being the cleared state of the bit. However, other encodings are possible, including encodings in which multiple bits are used and encodings in which the enabled state is the clear state and the disabled state is the set state. Accordingly, the remainder of this description may refer to the LME indication in control register 26 as the LME bit, with the enabled state being set and the disabled state being clear. However, other encodings of the LME indication are contemplated, as set forth above.

Segment registers 24 store information from the segment descriptors currently being used by the code being executed by processor 10. As mentioned above, CS is one of segment registers 24 and specifies the code segment of memory. The code segment stores the code being executed. Other segment registers may define various data segments (e.g. a stack data segment defined by the SS segment register, and up to four data segments defined by the DS, ES, FS, and GS segment registers). FIG. 1 illustrates the contents of an exemplary segment register 24A, including a selector field 24AA and a descriptor field 24AB. Selector field 24AA is loaded with a segment selector to activate a particular segment in response to certain segment load instructions executed by execution core 14. The segment selector identifies the segment descriptor in a segment descriptor table in memory. More particularly, processor 10 may employ two segment descriptor tables: a local descriptor table and a global descriptor table. The base address of the local descriptor table is stored in the LDTR 30. Similarly, the base address of the global descriptor table is stored in GDTR 32. A bit within the segment selector (the table indicator bit) selects the descriptor table, and the remainder of the segment selector is used as an index into the selected table. When an instruction loads a segment selector into one of segment registers 24, MMU 20 reads the corresponding segment descriptor from the selected segment descriptor table and stores information from the segment descriptor into the segment descriptor field (e.g. segment descriptor field 24AB for segment register 24A). The information stored in the segment descriptor field may comprise any suitable subset of the segment descriptor, including all of the segment descriptor, if desired. Additionally, other information derived from the segment descriptor or other sources may be stored in the segment descriptor field, if desired. For example, an embodiment may decode the operating mode indications from the code segment descriptor and store the decoded value rather than the original values of the operating mode indications. If an instruction causes CS to be loaded with a segment selector, the code segment may change and thus the operating mode of processor 10 may change.

In one embodiment, only the CS segment register is used in 32/64 mode. The data segment registers are ignored. In 16 and 32 bit modes, the code segment and data segments may be active. Furthermore, a second enable indication (PE) in control register 28 may affect the operation of MMU 20. The PE enable indication may be used to enable protected mode, in which segmentation and/or paging address translation mechanisms may be used. If the PE enable indication is in the disabled state, segmentation and paging mechanisms are disabled and processor 10 is in "real mode" (in which addresses generated by execution core 14 are physical addresses). Similar to the LME indication, the PE indication may be a bit in which the enabled state is the bit being set and the disabled state is the bit being clear. However, other embodiments are contemplated as described above.

It is noted that MMU 20 may employ additional hardware mechanisms, as desired. For example, MMU 20 may include paging hardware to implement paging address translation from virtual addresses to physical addresses. The paging hardware may include a translation lookaside buffer (TLB) to store page translations.

It is noted that control registers 26 and 28 may be implemented as architected control registers (e.g. control register 26 may be CR4 and control register 28 may be CR0). Alternatively, one or both of the control registers may be implemented as model specific registers to allow for other uses of the architected control registers without interfering with 32/64 mode.

Generally, instruction cache 12 is a high speed cache memory for storing instruction bytes. Execution core 14 fetches instructions from instruction cache 12 for execution. Instruction cache 12 may employ any suitable cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may communicate with MMU 20 to receive physical address translations for virtual addresses fetched from instruction cache 12.

Execution core 14 executes the instructions fetched from instruction cache 12. Execution core 14 fetches register operands from register file 22 and updates destination register operands in register file 22. The size of the register operands is controlled by the operating mode and any overrides of the operating mode for a particular instruction. Viewed in another way, execution core 14 operates upon operands of the operand size for that instruction (e.g. reading, updating, etc.). Similarly, execution core 14 fetches memory operands from data cache 16 and updates destination memory locations in data cache 16, subject to the cacheability of the memory operands and hitting in data cache 16. The size of the memory operands is similarly controlled by the operating mode and any overrides of the operating mode for a particular instruction. Furthermore, the size of the addresses of the memory operands generated by execution core 14 is controlled by the operating mode and any overrides of the operating mode for a particular instruction.

Execution core 14 may employ any suitable construction. For example, execution core 14 may be a superpipelined core, a superscalar core, or a combination thereof. Execution core 14 may employ out of order speculative execution or in order execution, according to design choice.

Register file 22 may include 64 bit registers which may be accessed as 64 bit, 32 bit, 16 bit, or 8 bit registers as indicated by the operating mode of processor 10 and any overrides for a particular instruction. The registers included in register file 22 may include 64 bit registers which may corresponding to the EAX, EBX, ECX, EDX, EDI, ESI, ESP, and EBP registers, and which may be named, e.g. RAX, RBX, etc. Register file 22 may further include a 64 bit register corresponding to the EIP register, and any additional architected registers which may be defined in the processor architecture employed by processor 10. Alternatively, execution core 14 may employ a form of register renaming in which any register within register file 22 may be mapped to an architected register. The number of registers in register file 22 may be implementation dependent for such an embodiment.

Data cache 16 is a high speed cache memory configured to store data. Data cache 16 may employ any suitable cache organization, including direct-mapped, set associative, and fully associative configurations. If a data fetch or update misses in data cache 16, data cache 16 may communicate with external interface unit 18 to fill the missing cache line into data cache 16. Additionally, if data cache 16 employs a writeback caching policy, updated cache lines which are being cast out of data cache 16 may be communicated to external interface unit 18 to be written back to memory. Data cache 16 may communicate with MMU 20 to receive physical address translations for virtual addresses presented to data cache 16.

External interface unit 18 communicates with portions of the system external to processor 10. External interface unit 18 may communicate cache lines for instruction cache 12 and data cache 16 as described above, and may communicate with MMU 20 as well. For example, external interface unit 18 may access the segment descriptor tables and/or paging tables on behalf of MMU 20.

It is noted that processor 10 may include an integrated level 2 (L2) cache, if desired. Furthermore, external interface unit 18 may be configured to communicate with a backside cache in addition to communicating with the system.

While the processor architecture described herein may be compatible with the x86 processor architecture for 16 and 32 bit modes, in one embodiment, other embodiments may employ any 16 and 32 bit modes. The other embodiments may or may not be compatible with the x86 processor architecture or any other processor architecture. It is further noted that, while a specific set of information is described herein as being used to generate the operating mode, any combination of indications and/or information from memory data structures such as segment descriptor tables and page tables may be used to generate the operating mode in various embodiments.

Figure 2:
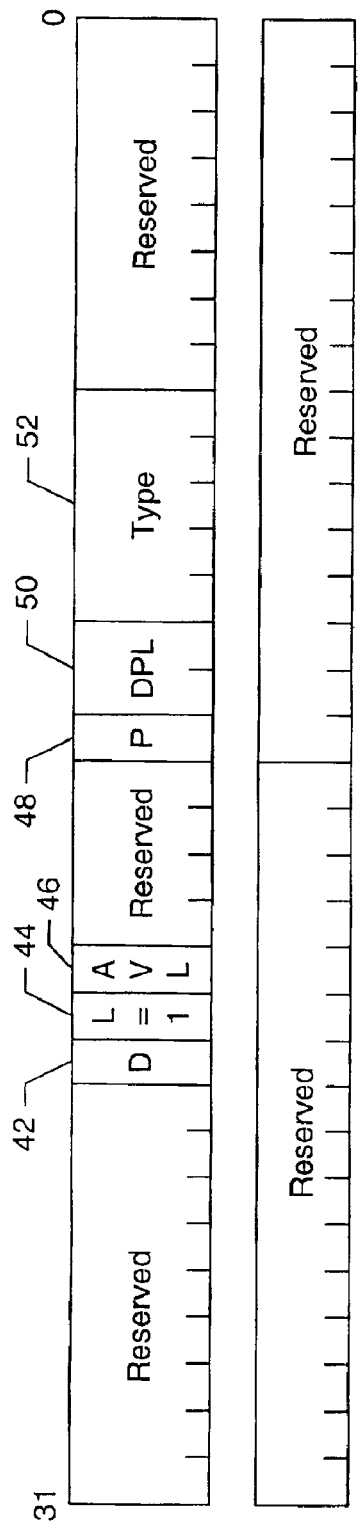
FIG. 2 is a block diagram of one embodiment of a segment descriptor for 32/64 mode.

Turning now to FIG. 2, a block diagram of one embodiment of a code segment descriptor 40 for 32/64 mode is shown. Other embodiments are possible and contemplated. In the embodiment of FIG. 2, code segment descriptor 40 comprises 8 bytes with the most significant 4 bytes illustrated above the least significant 4 bytes. The most significant four bytes are stored at a numerically larger address than the least significant four bytes. The most significant hit of each group of four bytes is illustrated as hit 31 in FIG. 2 (and FIG. 3 below), and the least significant bit is illustrated as bit 0. Short vertical lines within the four bytes delimit each bit, and the long vertical lines delimit a bit but also delimit a field (both in FIG. 2 and in FIG. 3).

Unlike the 32 bit and 16 bit code segment descriptors illustrated in FIG. 3 below, code segment descriptor 40 does not include a base address or limit. Processor 10 employs a flat virtual address space for 32/64 mode (rather than the segmented linear address space employed in 32 bit and 16 bit modes). Accordingly, the portions of code segment descriptor 40 which would otherwise store the base address and limit are reserved in segment descriptor 40. It is noted that a virtual address provided through segmentation may also be referred to herein as a "linear address". The term "virtual address" encompasses any address which is translated through a translation mechanism to a physical address actually used to address memory, including linear addresses and other virtual addresses generated in non-segmented architectures.

Figure 4:
FIG. 4 is a table illustrating one embodiment of operating modes as a function of segment descriptor and control register values.

Segment descriptor 40 includes a D bit 42, an L bit 44 (set to one for a 32164 mode code segment), an available bit (AVL) 46, a present (P) bit 48, a descriptor privilege level (DPL) 50, and a type field 52. D bit 42 and L bit 44 are used to determine the operating mode of processor 10, as illustrated in FIG. 4 below. AVL bit 46 is available for use by system software (e.g. the operating system). P bit 48 is used to indicate whether or not the segment is present in memory. If P bit 48 is set, the segment is present and code may be fetched from the segment. If P bit 48 is clear, the segment is not present and an exception is generated to load the segment into memory (e.g. from disk storage or through a network connection). The DPL indicates the privilege level of the segment. Processor 10 employs four privilege levels (encoded as 0 through 3 in the DPL field, with level 0 being the most privileged level). Certain instructions and processor resources (e.g. configuration and control registers) are only executable or accessible at the more privileged levels, and attempts to execute these instructions or access these resources at the lower privilege levels result in an exception. When information from code segment 40 is loaded into the CS segment register, the DPL becomes the current privilege level (CPL) of processor 10. Type field 52 encodes the type of segment. For code segments, the most significant bit two bits of type field 52 may be set (the most significant bit distinguishing a code or data segment from a system segment, and the second most significant bit distinguishing a code segment from a data segment), and the remaining bits may encode additional segment type information (e.g. execute only, execute and read, or execute and read only, conforming, and whether or not the code segment has been accessed).

It is noted that, while several indications in the code segment descriptor are described as bits, with set and clear values having defined meanings, other embodiments may employ the opposite encodings and may use multiple bits, as desired. Thus, for example, the D bit 42 and the L bit 44 may each be an example of an operating mode indication which may be one or more bits as desired, similar to the discussion of enable indications above.

Figure 3:
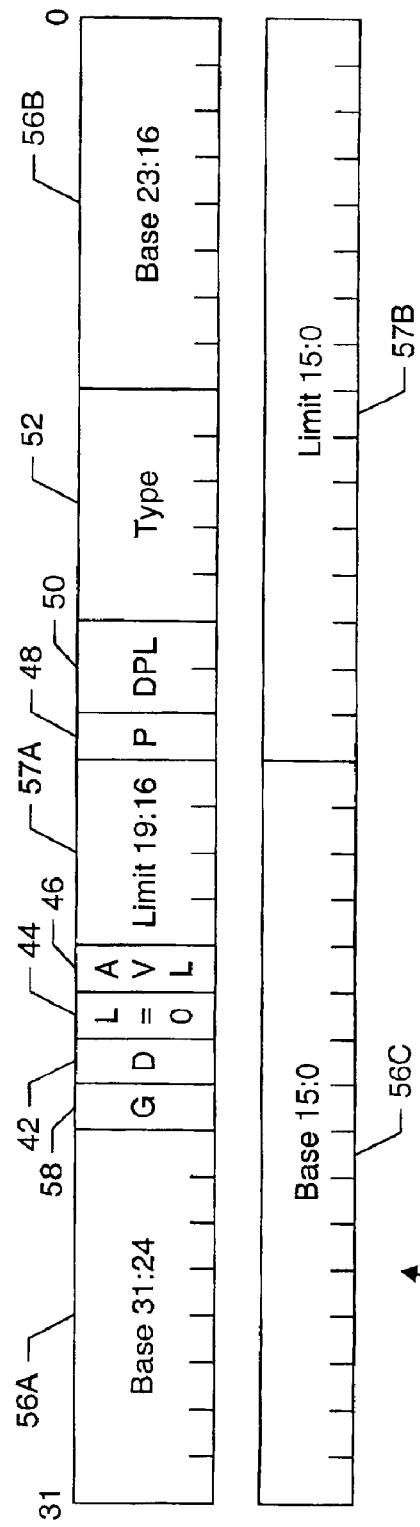
FIG. 3 is a block diagram of one embodiment of a segment descriptor for compatibility mode.

Turning now to FIG. 3, a block diagram of one embodiment of a code segment descriptor 54 for 32 and 16 bit compatibility mode is shown. Other embodiments are possible and contemplated. As with the embodiment of FIG. 2, code segment descriptor 54 comprises 8 bytes with the most significant 4 bytes illustrated above the least significant 4 bytes.

Code segment descriptor 54 includes D bit 42, L bit 44, AVL bit 46, P bit 48, DPL 50, and type field 52 similar to the above description of code segment descriptor 40. Additionally, code segment descriptor 54 includes a base address field (reference numerals 56A, 56B, and 56C), a limit field (reference numerals 57A and 57B) and a G bit 58. The base address field stores a base address which is added to the logical fetch address (e.g. stored in the 64 bit register corresponding to the EIP register) to form the linear address of an instruction, which may then optionally be translated to a physical address through a paging translation mechanism. The limit field stores a segment limit which defines the size of the segment. Attempts to access a byte at a logical address greater than the segment limit are disallowed and cause an exception. G bit 58 determines the scaling of the segment limit field. If G bit 58 is set the limit is scaled to 4 K byte pages (e.g. 12 least significant zeros are appended to the limit in the limit field). If G bit 58 is clear, the limit is used as is.

It is noted that code segment descriptors for 32 and 16 bit modes when 32/64 mode is not enabled via the LME bit in control register 26 may be similar to code segment descriptor 54, except the L bit is reserved and defined to be zero. It is further noted that, in 32 and 16 bit modes (both compatibility mode with the LME bit set and modes with the LME bit clear) according to one embodiment, data segments are used as well. Data segment descriptors may be similar to code segment descriptor 54, except that the D bit 42 is defined to indicate the upper bound of the segment or to define the default stack size (for stack segments).

Turning next to FIG. 4, a table 70 is shown illustrating the states of the LME bit, the L bit in the code segment descriptor, and the D bit in the code segment descriptor and the corresponding operating mode of processor 10 according to one embodiment of processor 10. Other embodiments are possible and contemplated. As table 70 illustrates, if the LME bit is clear, then the L bit is reserved (and defined to be zero). However, processor 10 may treat the L bit as a don't care if the LME bit is clear. Thus, the x86 compatible 16 bit and 32 bit modes may be provided by processor 10 if the LME bit is clear. If the LME bit is set and the L bit in the code segment is clear, then a compatibility operating mode is established by processor 10 and the D bit selects 16 bit or 32 bit mode. If the LME bit and the L bit are set and the D bit is clear, 32/64 mode is selected for processor 10. Finally, the mode which would be selected if the LME, L and D bits are all set is reserved.

As mentioned above, the 32/64 operating mode includes a default address size in excess of 32 bits (implementation dependent but up to 64 bits) and a default operand size of 32 bits. The default operand size of 32 bits may be overridden to 64 bits via a particular instruction's encoding. The default operand size of 32 bits is selected to minimize average instruction length (since overriding to 64 bits involves including an instruction prefix in the instruction encoding which may increase the instruction length) for programs in which 32 bits are sufficient for many of the data manipulations performed by the program. For such programs (which may be a substantial number of the programs currently in existence), moving to a 64 bit operand size may actually reduce the execution performance achieved by the program (i.e. increased execution time). In part, this reduction may be attributable to the doubling in size in memory of the data structures used by the program when 64 bit values are stored. If 32 bits is sufficient, these data structures would store 32 bit values, Thus, the number of bytes accessed when the data structure is accessed increases if 64 bit values are used where 32 bit values would be sufficient, and the increased memory bandwidth (and increased cache space occupied by each value) may cause increased execution time. Accordingly, 32 bits is selected as the default operand size and the default may be overridden via the encoding of a particular instruction.

More particularly in one embodiment, various prefix bytes may be defined. A prefix byte or bytes may be encoded into an instruction to override the default operand size or address size. In addition to overriding the default operand size via one or more operand size override prefixes, certain instruction encodings themselves may specify an override of the default (e.g. via the opcode encoding). Eight bit operand sizes may be specified in this manner, for example. Thus, a given instruction may have an 8, 16, 32, or 64 bit operand size in the present embodiment.

As illustrated above, the operand size may be varied among various supported operand sizes on an instruction-by-instruction basis. Register file 22 may employ registers capable of storing the largest operand size (e.g. 64 bits in the present embodiment). Accordingly, processor 10 may determine, when the operand size of an instruction is less than the largest operand size, the resulting value of the bits within the register which would not otherwise be updated by the result of the instruction. For example, if the register is capable of storing 64 bits and the result is 32 bits, the most significant 32 bits of the register would not otherwise be updated. Similarly, if the register is capable of storing 64 bits and the result is 16 bits, the most significant 48 bits would not otherwise be updated, etc. The resulting value of the otherwise not updated bits is specified so that the programmer has reliable knowledge of the value in the entire register and thus may produce code sequences having varying operand sizes but which produce sensible results when executed. In one embodiment, the definition is to zero extend 32 bit results and not zero extend 16 bit or 8 bit results. In one embodiment, the remaining bits of the register are preserved for 16 bit or 8 bit results. In another embodiment, at least some of the remaining bits of the register are preserved. More particularly, the remaining bits within the least significant 32 bits may be preserved, and the most significant 32 bits may be zero extended. Preserving the remaining bits for 16 bit and 8 bit operands may provide compatibility with the 32 bit and 16 bit operating modes. Additionally, preserving the remaining bits for 8 bit operands may provide compatibility with the addressability of both the least significant 8 bits and the next least significant 8 bits (bits eight through 15) of the register for 8 bit operands.

In one embodiment, zero extending 32 bit results may provide for increased performance of 32 bit operations in the processor. The processor may read the previous value of a destination register of an instruction if the destination register is not being updated in its entirety. The previous value of the non-updated portion may be merged with the result generated by the instruction, and the merged value may be stored in the destination register (which may eliminate hardware for performing partial register updates, e.g. write enables on a register file). Thus, in this embodiment, the processor may experience a dependency on the destination register, even if the destination register is not also a source register for the instruction (e.g., for a load instruction). By zero extending 32 bit results, the entirety of the 64 bit destination register may be updated and thus no read of the destination register prior to executing the instruction may be required for 32 bit operations. Since 32 bit operations may be expected to dominate in typical code, the performance increase may be substantial.

Figure 5:
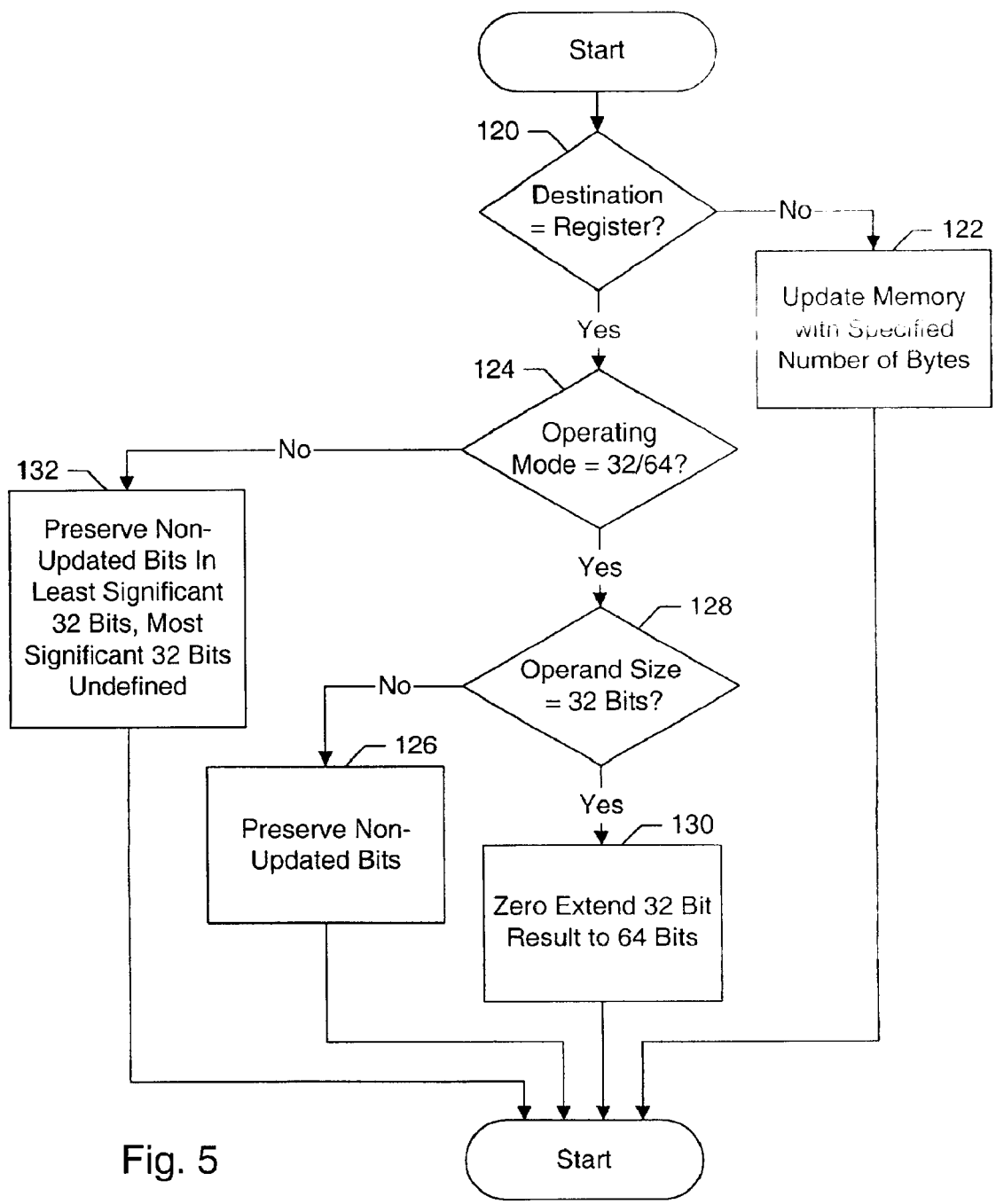
FIG. 5 is a flowchart illustrating operation of one embodiment of an execution core for handling results which are smaller than the register size.

Turning now to FIG. 5, a flowchart is shown illustrating operation of one embodiment of execution core 14 for updating a destination of an instruction. Other embodiments are possible and contemplated. While steps may be shown in FIG. 5 in a particular order for ease of understanding, any suitable order may be used. Additionally, the combinatorial logic circuitry in execution core 14 may perform various steps in parallel.

As used herein, the term "destination" when used with respect to an instruction refers to the storage location which is identified by the instruction to store the result of executing the instruction. In the present embodiment, the destination may be a register or a memory location.

If the destination of the instruction is not a register (decision block 120), execution core 14 may update the specified memory location (or its cached copy in data cache 16) with the number of bytes specified by the operand size (e.g. 1, 2, 4, or 8 bytes for operand sizes of 8, 16, 32, and 64 bits, respectively) (step 122).

If the destination is a register and the operating mode is not 32/64 mode (decision block 124), execution core 14 may update the destination register in such a way as to preserve the non-updated bits of the register (step 132). It is noted that, in 32 or 16 bit mode, the register is defined to be 32 bits and thus the preserved bits may refer to the non-updated bits within the least significant 32 bits of the register (which may physically include 64 bits). The most significant 32 bits of the register may be undefined. Execution core 14 may not preserve the most significant 32 bits, if desired.

Execution core 14 may accomplish the preservation in any suitable fashion. For example, execution core 14 may read the previous value from the register when executing the instruction, and may merge the non-updated portion of the previous value with the result of the instruction and store the merged result into the destination register. As another example, register file 22 may include write enable signals for each portion of the register (e.g. one signal each for the portion storing bits 0–7, the portion storing bits 8–15, the portion storing bits 16–31, and the portion storing bits 32–63). Execution core 14 may assert the write enable signals for the portions updated by the result, and deassert the write enable signals for the portions not updated by the result (thereby preserving the values). Other embodiments may employ alternative mechanisms for preserving the non-updated bits. As used herein, one or more bits of a register are "preserved" during execution of the instruction if the bits have the same value after updating the register in response to executing the instruction as the bits have prior to executing the instruction.

If the destination is a register, the operating mode is the 32/64 bit operating mode, and the operand size is 32 bits (decision block 128), then execution core 14 zero extends the 32 bit result to 64 bits (step 130). On the other hand, if the operand size is not 32 bits, then execution core 14 preserves the non-updated portion of the destination register (step 126).

Generally, zero extension of a first value of a first size to a second value of a second size refers to filling the bits in the second value in excess of the bits which are included in the first value with zeros. A result may be zero extended if each remaining bit in the destination (other than the result bits) is set to zero.

It is further noted that, while the above flowchart illustrates the handling of register updates based on the operating mode and operand size, in other embodiments the handling of register updates may be dependent only on the operand size. For example, if the processor has only one operating mode, the handling of register updates may be dependent only on the operand size. Furthermore, an embodiment in which execution core 14 handles the register updates as if in 32I64 mode regardless of the mode (since the most significant 32 bits may be undefined) may be dependent only on the operand size.

Figure 6:
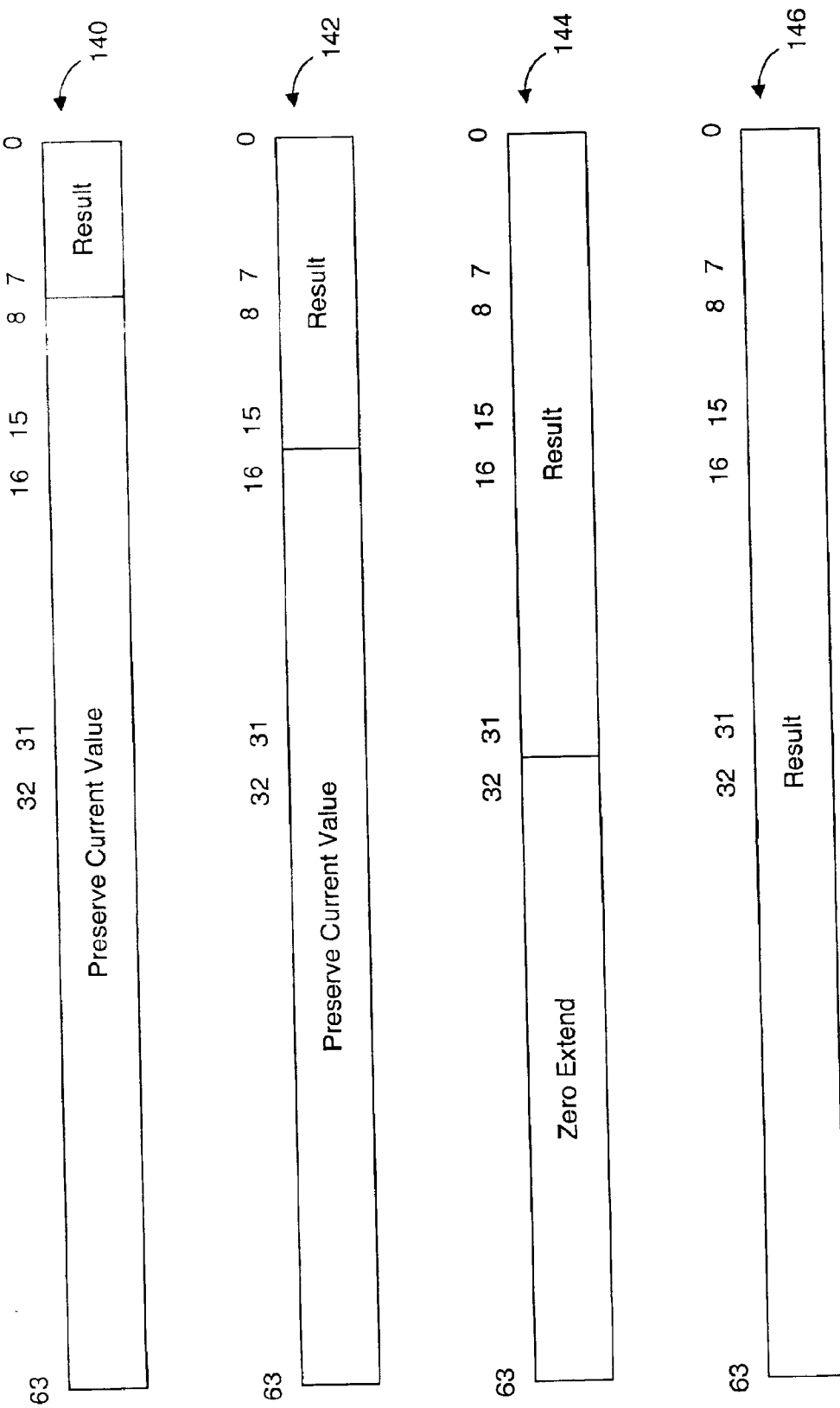
FIG. 6 is a block diagram illustrating one embodiment of a 64 bit register storing results of various sizes.

Turning now to FIG. 6, a block diagram of an update of an exemplary register in 32/64 operating mode used as a destination of instructions having various operand sizes is shown according to one embodiment of processor 10 and execution core 14. Other embodiments are possible and contemplated.

At reference numeral 140, the exemplary register is the destination for an 8 bit result. Accordingly, the least significant 8 bits of the register are updated with the result, and the remaining bits are preserved. It is noted that, in one embodiment, an 8 bit result may be stored into either the least significant 8 bits of the register (as shown at reference numeral 140) or in the next least significant 8 bits (bits 15–8) depending on the encoding of the instruction. If the 8 bit result is stored in the next least significant 8 bits, bits 7–0 and 63–16 may be preserved.

At reference numeral 142, the exemplary register is the destination for a 16 bit result. Accordingly, the least significant 16 bits of the register are updated with the result, and the remaining bits are preserved.

At reference numeral 144, the exemplary register is the destination for a 32 bit result. Accordingly, the least significant 32 bits of the register are updated with the result, and the remaining bits are updated with a zero extension.

Finally, at reference numeral 146, the exemplary register is the destination for a 64 bit result. Accordingly, the 64 bit result is stored into the register.

Figure 7:
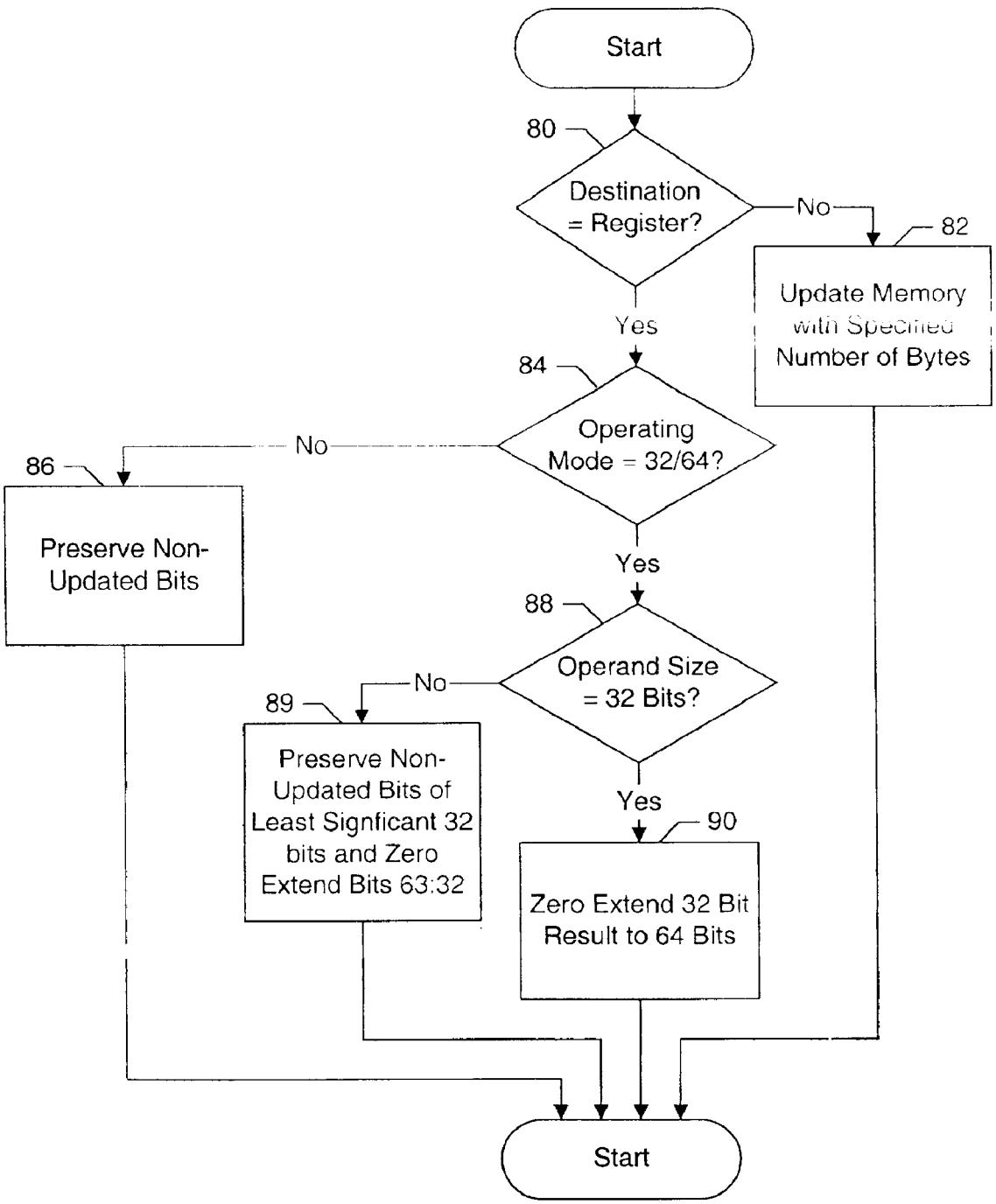
FIG. 7 is a flowchart illustrating operation of a second embodiment of an execution core for handling results which are smaller than the register size.

Turning now to FIG. 7, a flowchart is shown illustrating operation of a second embodiment of execution core 14 for updating a destination of an instruction. Other embodiments are possible and contemplated. While steps may be shown in FIG. 7 in a particular order for ease of understanding, any suitable order may be used. Additionally, the combinatorial logic circuitry in execution core 14 may perform various steps in parallel.

If the destination of the instruction is not a register (decision block 80), execution core 14 may update the specified memory location (or its cached copy in data cache 16) with the number of bytes specified by the operand size (e.g. 1, 2, 4, or 8 bytes for operand sizes of 8, 16, 32, and 64 bits, respectively) (step 82).

If the destination is a register and the operating mode is not 32I64 mode (decision block 84), execution core 14 may update the destination register in such a way as to preserve the non-updated bits of the register (step 86). It is noted that, in 32 or 16 bit mode, the register is defined to be 32 bits and thus the preserved bits may refer to the non-updated bits within the least significant 32 bits of the register (which may physically include 64 bits). Execution core 14 may accomplish the preservation in any suitable fashion, similar to the above description of step 126 in FIG. 5.

If the destination is a register, the operating mode is the 32/64 bit operating mode, and the operand size is 32 bits (decision block 88), then execution core 14 zero extends the 32 bit result to 64 bits (step 90). On the other hand, if the operand size is not 32 bits, then execution core 14 preserves the non-updated portion of the least significant 32 bits of the destination register (step 89). Additionally, execution core 14 may zero extend the most significant 32 bits of the register (bits 63:32). Zero extending the most significant 32 bits may allow for simplification in the hardware, since zero extension of the most significant 32 bits is performed for any operand size.

It is noted that, while the above flowchart illustrates the handling of register updates based on the operating mode and operand size, in other embodiments the handling of register updates may be dependent only on the operand size. For example, if the processor has only one operating mode, the handling of register updates may be dependent only on the operand size. Furthermore, an embodiment in which execution core 14 handles the register updates as if in 32/64 mode regardless of the mode (since the most significant 32 bits may be undefined) may be dependent only on the operand size.

Figure 8:
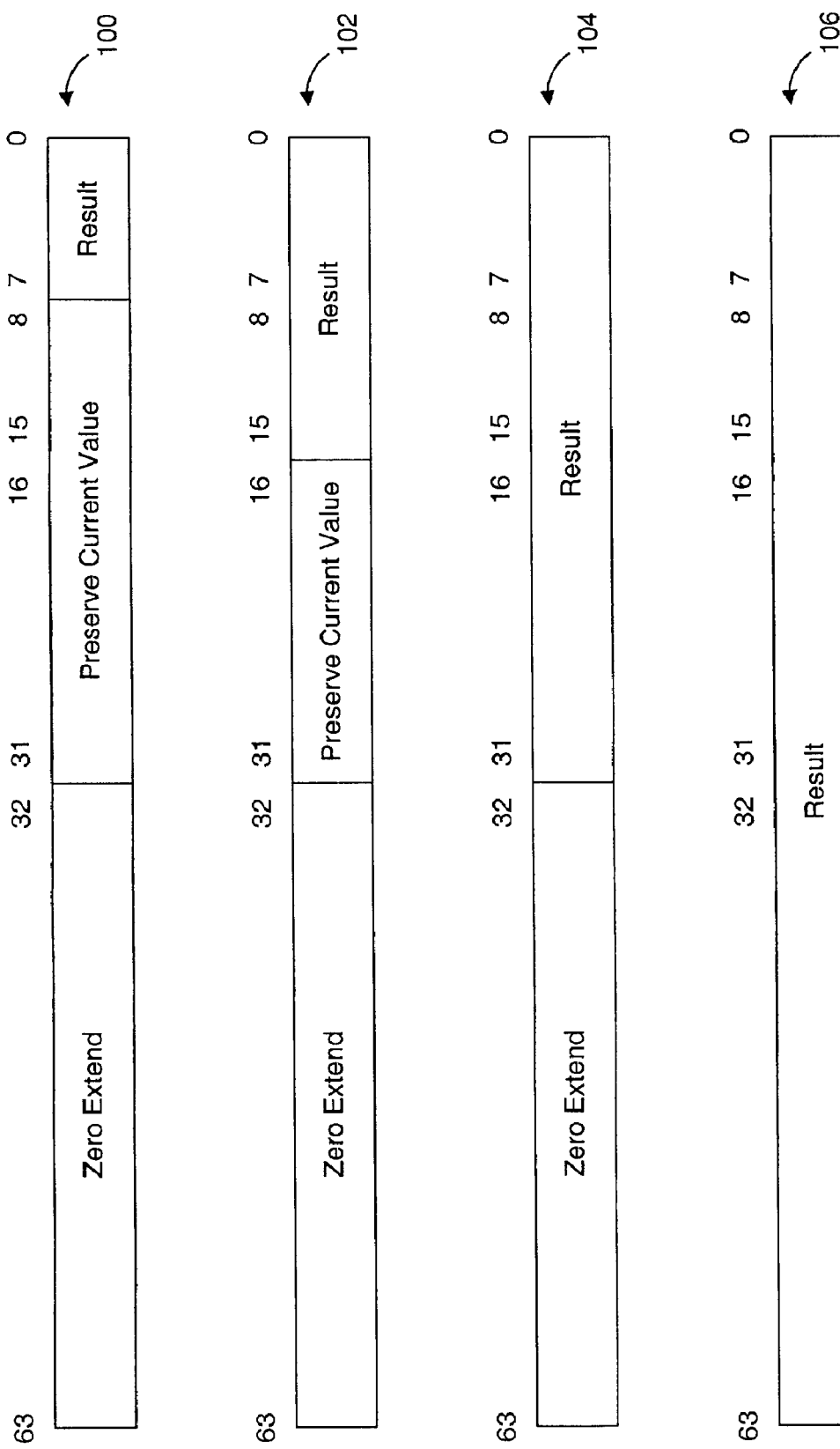
FIG. 8 is a block diagram illustrating a second embodiment of a 64 bit register storing results of various sizes.

Turning now to FIG. 8, a block diagram of an update of an exemplary register in 32/64 operating mode used as a destination of instructions having various operand sizes is shown according to a second embodiment of processor 10 and execution core 14. Other embodiments are possible and contemplated.

At reference numeral 100, the exemplary register is the destination for an 8 bit result. Accordingly, the least significant 8 bits of the register are updated with the result, and the remaining bits of the least significant 32 bits are preserved.

The most significant 32 bits are zero extended. It is noted that, in one embodiment, an 8 bit result may be stored into either the least significant 8 bits of the register (as shown at reference numeral 100) or in the next least significant 8 bits (bits 15–8) depending on the encoding of the instruction. If the 8 bit result is stored in the next least significant 8 bits, bits 7–0 and 31–16 may be preserved (and bits 63–32 may be zero extended).

At reference numeral 102, the exemplary register is the destination for a 16 bit result. Accordingly, the least significant 16 bits of the register are updated with the result, and the remaining bits of the least significant 32 bits are preserved. The most significant 32 bits are again zero extended.

At reference numeral 104, the exemplary register is the destination for a 32 bit result. Accordingly, the least significant 32 bits of the register are updated with the result, and the remaining bits are updated with a zero extension.

Finally, at reference numeral 106, the exemplary register is the destination for a 64 bit result. Accordingly, the 64 bit result is stored into the register.

Figure 9:
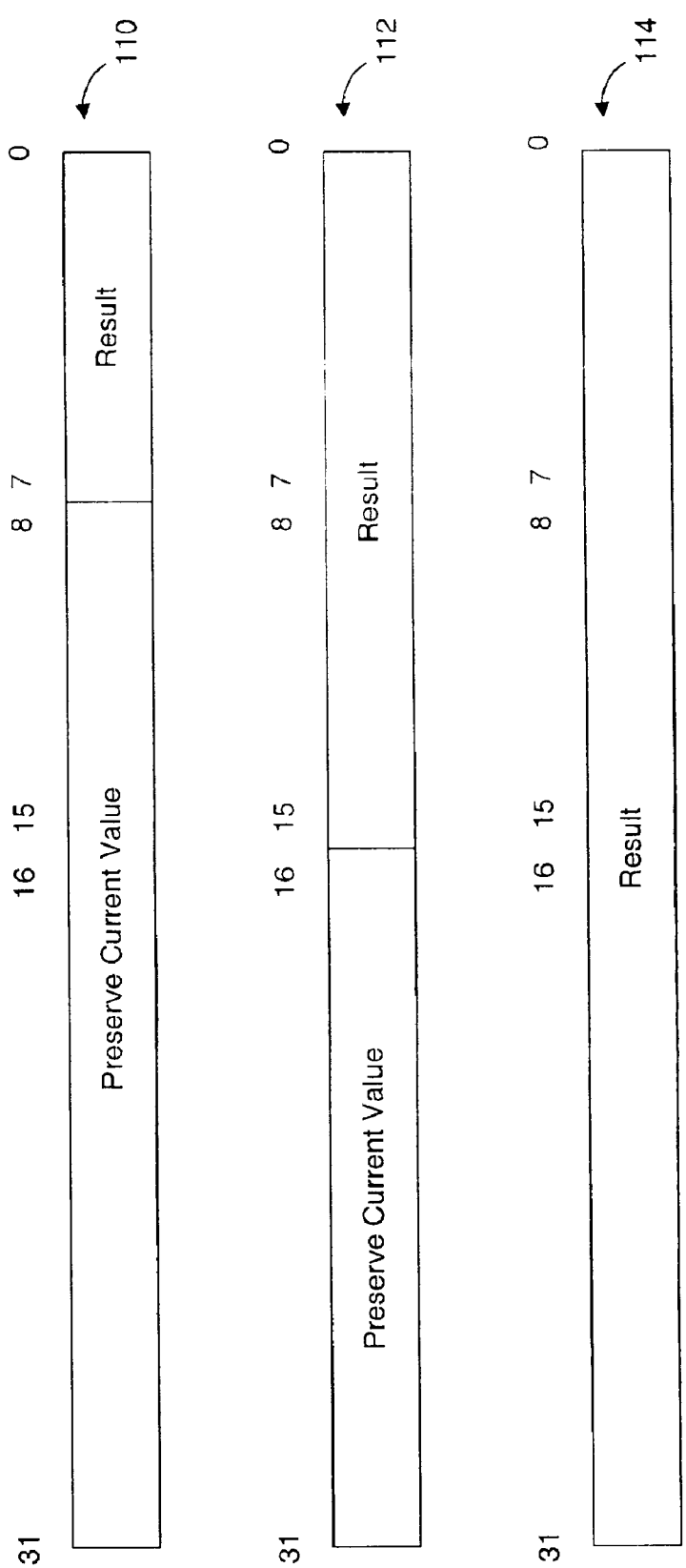
FIG. 9 is a block diagram illustrating one embodiment of a 32 bit register storing results of various sizes.

Turning next to FIG. 9, a block diagram of an update of an exemplary register in 32 bit operating mode used as a destination of instructions having various operand sizes is shown according to one embodiment of processor 10 and execution core 14. Other embodiments are possible and contemplated. Since the operating mode is 32 bit, the exemplary register is shown having 32 bits. However, the 32 bits shown may be the least significant bits of a 64 bit register within register file 22. As mentioned above, the most significant 32 bits of registers may be undefined in 32 or 16 bit modes. The embodiment shown in FIG. 9 may be used with either embodiment of processor 10 and execution core 14 described above (i.e. the embodiment corresponding to FIGS. 5 and 6 and the embodiment corresponding to FIGS. 7 and 8).

At reference numeral 110, the exemplary register is the destination for an 8 bit result. Accordingly, the least significant 8 bits of the register are updated with the result, and the remaining bits are preserved. As mentioned above, in one embodiment, an 8 bit result may be stored into either the least significant 8 bits of the register (as shown at reference numeral 110) or in the next least significant 8 bits (bits 15–8) depending on the encoding of the instruction. If the 8 bit result is stored in the next least significant 8 bits, bits 7–0 and 31–16 may be preserved.

At reference numeral 112, the exemplary register is the destination for an 16 bit result. Accordingly, the least significant 16 bits of the register are updated with the result, and the remaining bits are preserved.

At reference numeral 114, the exemplary register is the destination for a 32 bit result. Accordingly, the 32 bit result is stored into the register.

Computer Systems

Figure 10:
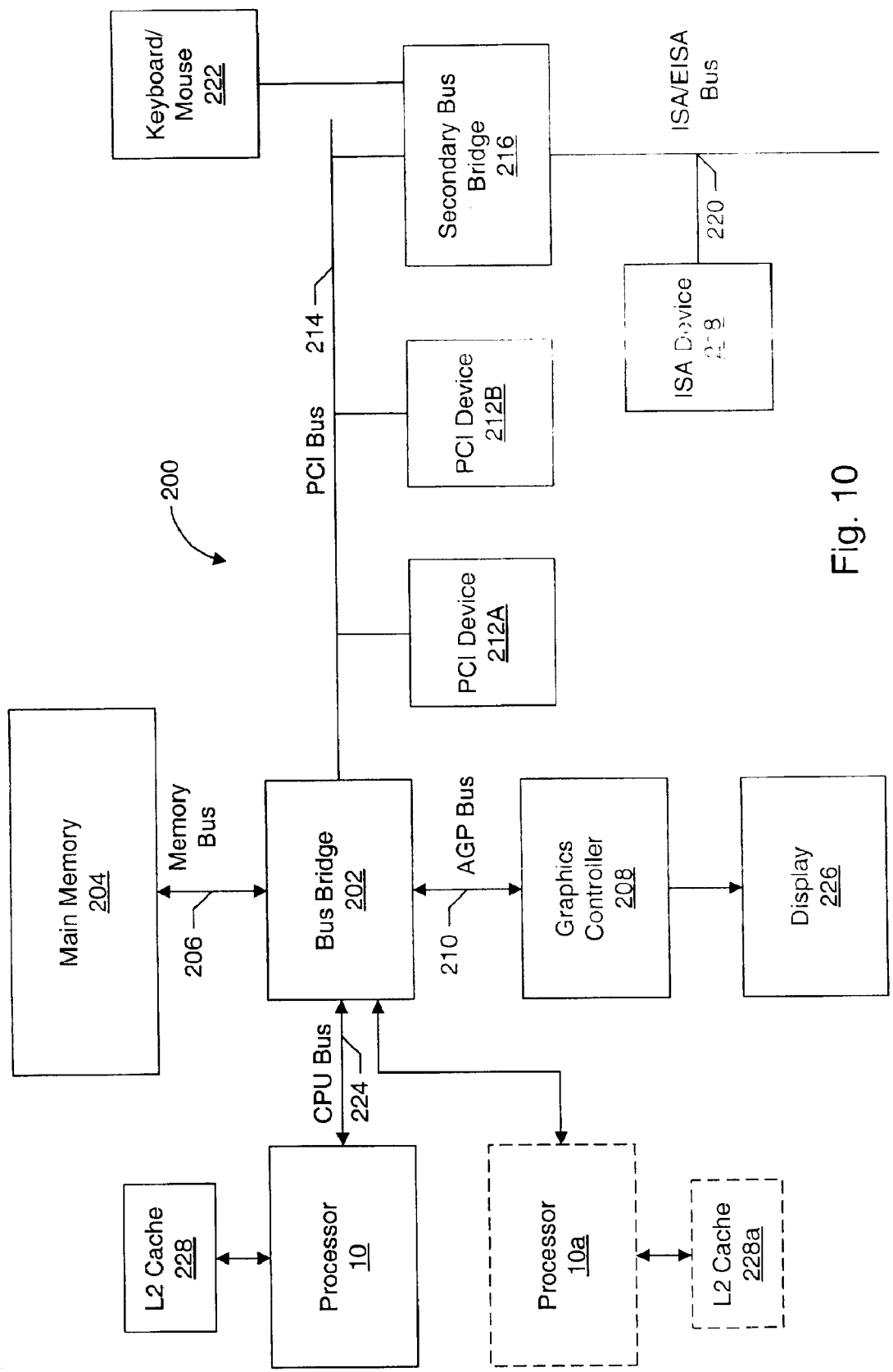
FIG. 10 is a block diagram of one embodiment of a computer system including the processor shown in FIG. 1.

Turning now to FIG. 10, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a 1 PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 10) or may share CPU bus 224 with processor 10. Furthermore, processor 10a may be coupled to an optional L2 cache 228a similar to L2 cache 228.

Figure 11:
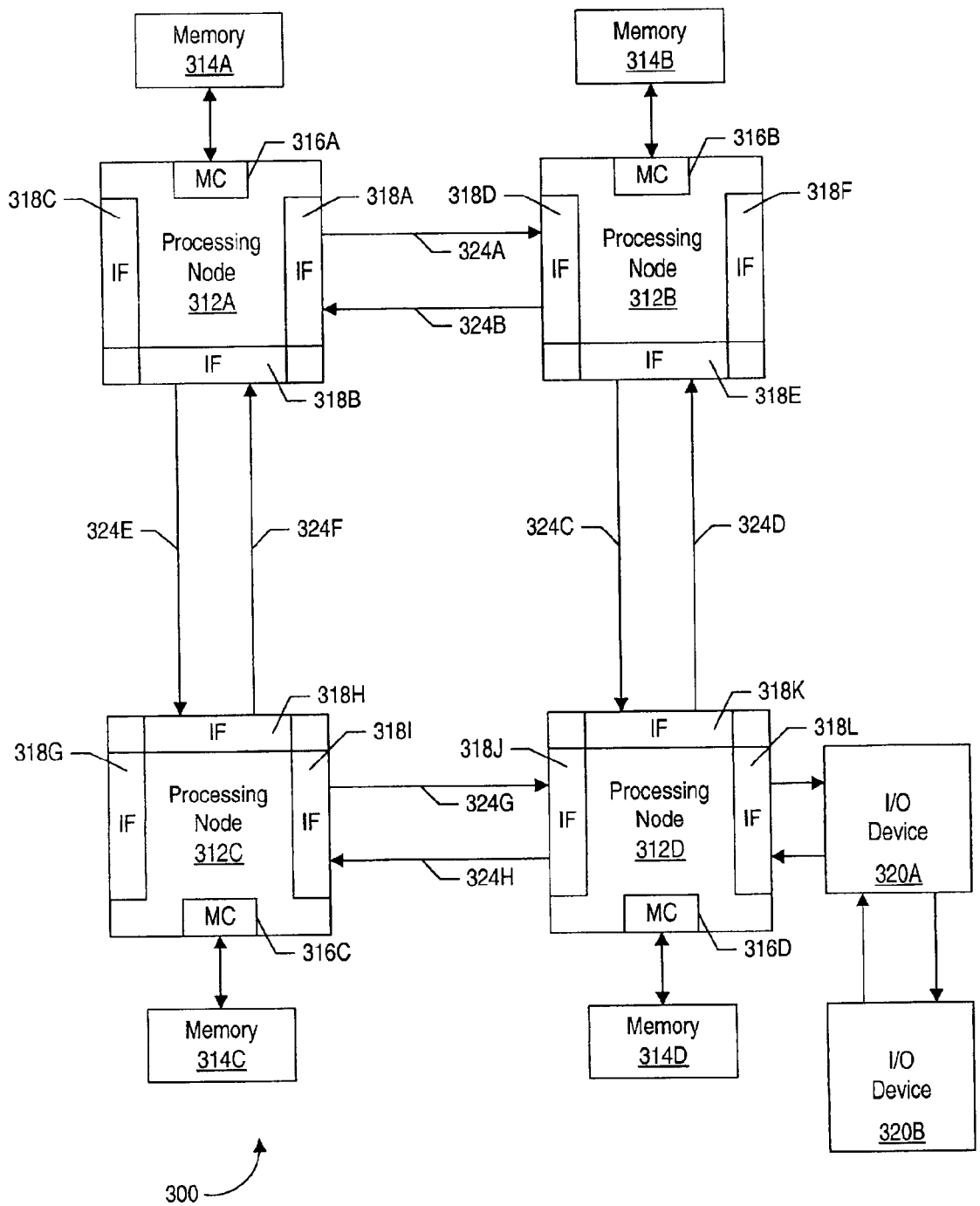
FIG. 11 is a block diagram of another embodiment of a computer system including the processor shown in FIG. 1.

Turning now to FIG. 11, another embodiment of a computer system 300 is shown. Other embodiments are possible and contemplated. In the embodiment of FIG. 11, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 11. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a noncoherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 11. Any suitable routing algorithm may be used. Other embodiments of computer system 300 may include more or fewer processing nodes then the embodiment shown in FIG. 11.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers. SCSI (Small Computer Systems Interface) adapters and telephony cards, modems, sound cards, and a variety of data acquisition cards such as GPIB or field bus interface cards.

Software Embodiments

While the above description may generally have described a processor which may directly support, in hardware, the processor architecture having the features described above, it is contemplated that other processor embodiments may not directly implement the processor architecture. Instead, such embodiments may directly implement a different processor architecture (referred to below as a native processor architecture, which may define a native instruction set including native instructions). Any native processor architecture may be used. For example, the MIPS, Power PC, Alpha, Sparc, ARM, etc. architectures may be used. The processor architecture may be implemented in software executing on the native processor architecture in a variety of fashions, using any native processor architecture such as, for example, the Crusoe products of Transmeta Corporation.

Generally, a processor embodiment implementing a native processor architecture different than the processor architecture described above (referred to below as the normative processor architecture) may support the non-native processor architecture in a variety of fashions. For example, such a processor embodiment may execute interpreter software which reads each non-native instruction in a non-native code sequence as data, and executes various software routines which emulate the defined operation of the normative instruction as defined in the non-native processor architecture. Alternatively, translator software may be executed. The translator software may translate the non-native instructions in the code sequence to an equivalent set of native instructions defined by the native instruction set architecture. The native code sequence may be stored in memory, and may be executed instead of the corresponding non-native code sequence. In yet another alternative, a mixture of interpretation and translation may be used. For example, the code sequence may be interpreted, but the interpreter may also generate statistics about which parts of the code sequence are being most frequently executed. The most frequently executed portions may then be translated to native code sequences.

In any of the above methods, the architected state defined by the non-native processor architecture may be maintained by the combination of the processor and the software (interpreter or translator) in a variety of fashions. For example, the non-native architected state may be mapped to memory locations in a memory addressable by the processor, to general registers defined by the native processor architecture (by software convention, either in the interpreter or in the translator), or the processor may directly support the non-native architected state by defining registers or other storage hardware within the processor that corresponds to the non-native architected state. The non-native architected state may be stored using any combination of the above methods, as desired.

Generally, the architected state includes any state defined to exist by the architecture. For example, in the above described embodiment, the non-native architected state may include general registers (e.g. RAX, RBX, etc.), segment registers, control registers, other registers such as the model specific registers (MSRs), etc. Additionally, the architected state may include data structures defined for the operating system to create, such as the descriptor tables, page tables, task state segments, etc.

Figure 12:
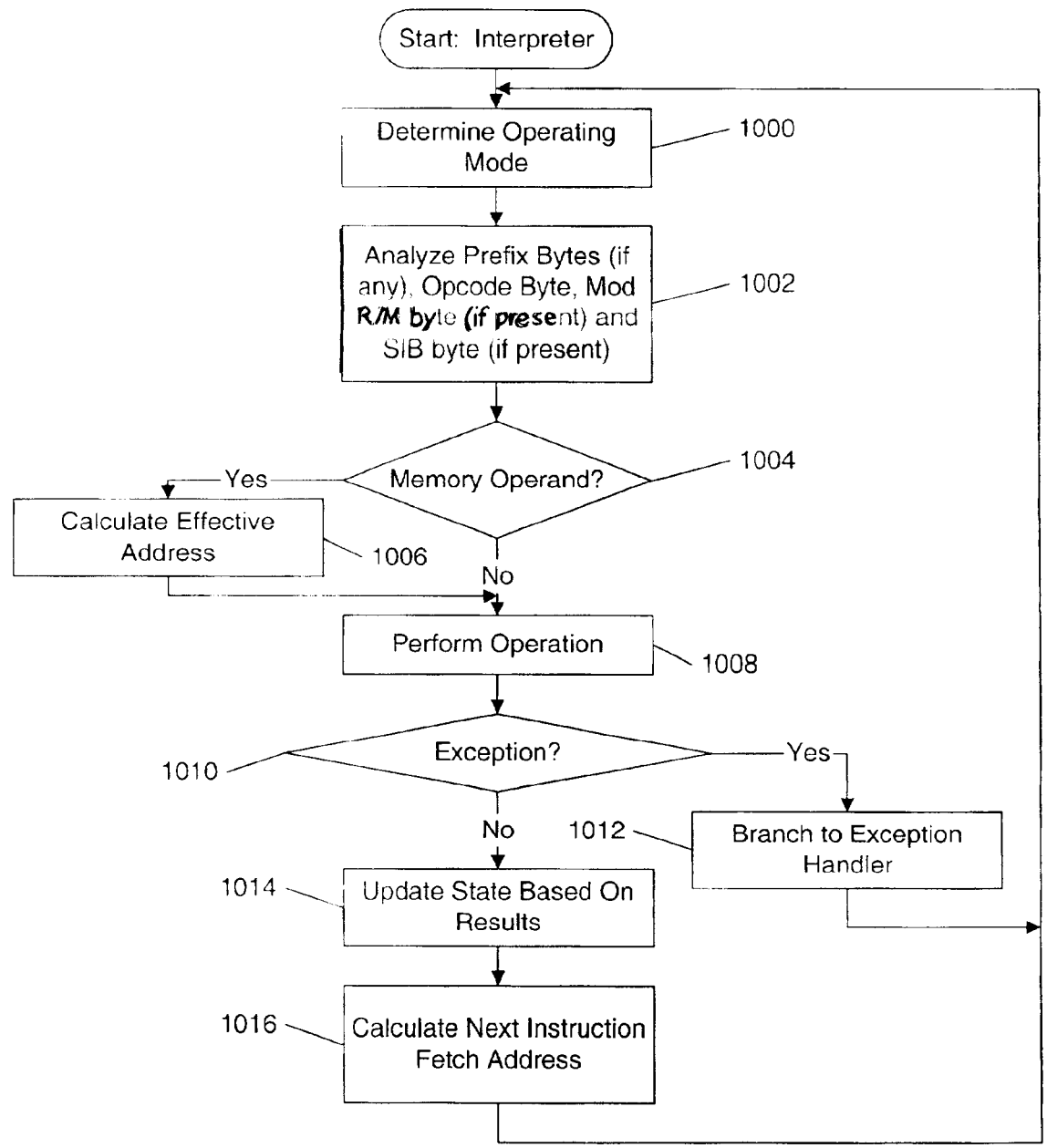
FIG. 12 is a flowchart illustrating one embodiment of an interpreter.

Turning to FIG. 12, a flowchart illustrating an exemplary interpreter which may be used to interpret non-native instructions is shown. Other embodiments are possible and contemplated. While the blocks shown are illustrated in a particular order for ease of understanding, any suitable order may be used. Furthermore, blocks may be performed in parallel as desired.

The blocks shown in FIG. 12 illustrate the emulation of one non-native instruction. Generally, the interpreter may execute the blocks shown in FIG. 12 for each non-native instruction to be executed according to the non-native code sequence to be executed.

The interpreter may determine the operating mode for the non-native instruction (block 1000). As described above, the operating mode may be determined from the LME bit in control register 26 and the L bit and D bit from the code segment descriptor indicated by the CS segment register. The operating mode may be determined anew from the LME, L bit, and D bit for each non-native instruction, or the resulting operating mode may be stored in a temporary register for access by the interpreter for each non-native instruction. If the resulting operating mode is stored, the interpreter may update the stored operating mode if an instruction modifies the CS segment register or interrupt or exception handling causes the operating mode to change. As mentioned above, the CS segment register and the control register(s) (which are part of the non-native architected state) may actually be memory locations, general registers, or special purpose registers, or any combination thereof.

The interpreter may read the current non-native instruction from memory, and may analyze the non-native instruction to determine the operations to be taken to emulate the non-native instruction (block 1002). The interpreter may read the non-native instruction one byte at a time, or may read a suitable set of consecutive bytes and process the bytes. For example, a native processor architecture in which operands are 32 bit may read 32 bits (4 bytes) of the non-native instruction at a time, and then may process the four bytes before reading any additional bytes.

Generally, the interpreter software may decode the non-native instruction in a manner analogous to processor 10 decoding the instruction in hardware. Thus, for the illustrated non-native processor architecture, which is compatible with the x86 processor architecture, the analyzing of the non-native instruction includes analyzing any prefix bytes which may precede the opcode byte, analyzing the opcode byte, analyzing the addressing mode (Mod R/M) byte (if present), and analyzing the scale-index-base (SIB) byte (if present). Prefix bytes may override the operating mode. The opcode byte specifies the operation to be performed, and in some cases may include a register specifier or may implicitly specify an operand (e.g. the stack or the stack pointer). The Mod R/M byte specifies operands (including any displacement or immediate operands which may follow the Mod R/M byte or the SIB byte, if the SIB byte is present) and may include register specifiers. Finally, the SIB byte may include register specifiers. From the information gained from analyzing the non-native instruction, the interpreter has the information to emulate the non-native instruction (including operating mode for the normative instruction, which specifies the operand size and address size of the non-native instruction, operands, the operation to be performed, etc.).

If the non-native instruction includes a memory operand (decision block 1004), the interpreter may calculate the effective address of the instruction (block 1006). If the non-native instruction has a memory operand, some of the operands identified in block 1002 may be address operands used to generate the effective address. Thus, the interpreter may read the address operands from the non-native architected state and may add them to generate an effective address. The size of the effective address may be determined by the address size for the instruction, as determined at blocks 1000 and 1002. It is noted that the native processor architecture may support an address size which is less than the address size supported by the non-native processor architecture. For example, in one exemplary embodiment described above, the virtual address size may be 48 bits in 32/64 mode. The native processor may, for example, support a virtual address size of 32 bits. In such an embodiment, block 1006 may represent a series of calculations in which the least significant bits (e.g. 32 bits) of the virtual address may be calculated, and any carry from the least significant bits may be carried into a calculation of the most significant bits of the virtual address.

The interpreter may then perform the operation specified by the non-native instruction (block 1008). If the non-native instruction includes a memory operand as a source operand, the interpreter may read the memory operand from the effective address calculated at block 1006. Other operands may be read from the non-native architected state. The operation may include an arithmetic operation, a logical operation, a shift, a move to another storage location, etc. The native processor architecture may support an operand size smaller than the operand size of the instruction. In such cases, performing the operation may include multiple calculations on portions of the operand to calculate the result.

The interpreter determines if the non-native instruction resulted in an exception (decision block 1010). Generally, exceptions may occur throughout the execution of the operations specified by the non-native instruction. For example, accessing a source memory operand may result in a page fault before any of the actual instruction operation is performed. During the operations, various architecturally-defined exceptions may also occur. The interpreter may interrupt processing of the non-native instruction upon detecting an exception, and may branch to exception handler instructions (block 1012). The exception handler may be native code or non-native code, as desired. If the normative processor architecture specifies the update of any architected state when an exception is taken (e.g. various control registers may store the address of the exception causing instruction, the exception reason, etc.), the interpreter may update the non-native architected state as defined.

It is noted that the interpreter software is executing on the native processor, and thus is subject to experiencing exceptions as defined in the native processor architecture. These exceptions may generally be different the exceptions detected by the interpreter software, which are exceptions experienced by the non-native code being interpreted according to the non-native processor architecture.

If no exception occurs during emulation of the non-native instruction, the interpreter may update the non-native architected state according to the definition of the non-native instruction (block 1014). More particularly, the update of a destination register may include selective zero extension (e.g. as illustrated above in FIGS. 5 and 6, for one embodiment, or FIGS. 7 and 8, for another embodiment). Finally, the interpreter may calculate the next non-native instruction fetch address to fetch the next instruction (block 1016). The next fetch address may be sequential to the current non-native instruction, or may be a different address (e.g. if the current non-native instruction is a taken branch, the next fetch address may be the target address of the branch instruction).

It is noted that the interpreter may operate in protected mode, using virtual addresses. In other words, the effective address calculated at block 1006 may be a virtual address which is translated by the translation mechanism specified by the non-native processor architecture to a physical address. The processor may include a translation lookaside buffer (TLB) used to cache translations. The processor may either support reload of the TLB from the non-native translation tables (page tables), or may take an exception on a TLB miss to allow software reload of the TLB.

Figure 13:
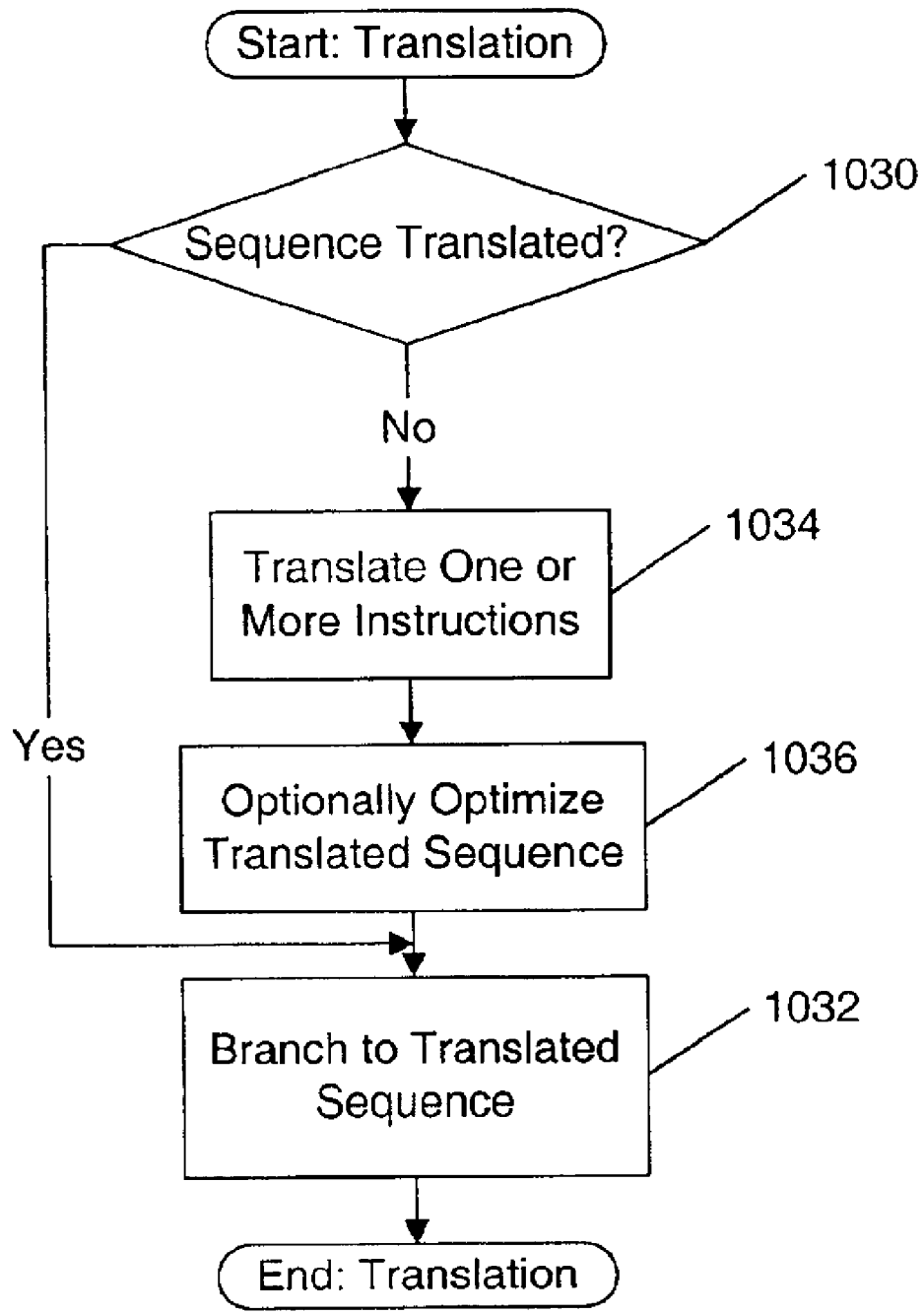
FIG. 13 is a flowchart illustrating one embodiment of a translator.

Turning to FIG. 13, a flowchart illustrating an exemplary translator which may be used to translate non-native instructions in the non-native processor architecture to native instructions in the native processor architecture. Other embodiments are possible and contemplated. While the blocks shown are illustrated in a particular order for ease of understanding, any suitable order may be used. Furthermore, blocks may be performed in parallel, as desired.

The blocks shown in FIG. 13 illustrate the translation of one non-native code sequence responsive to a fetch address for the first instruction in the non-native code sequence. The code translator may translate any number of non-native instructions to produce a translated code sequence having native instructions. For example, the translator may translate from the initial non-native instruction to a basic block boundary (i.e. a branch instruction). Alternatively, the translator may speculatively translate two or more basic blocks or may translate up to a maximum number of non-native or resulting native instructions, if desired.

Generally, the translator may maintain a translation cache which stores translated code sequences previously produced by the translator. The translation cache may identify translated code sequences by the fetch address of the first non-native instruction in the corresponding non-native code sequences. Thus, the translator may determine if a translated code sequence corresponding to the fetch address is stored in the translation cache (decision block 1030). If there is a translated code sequence in the translation cache, the translator may cause the processor to branch to that translated code sequence (block 1032). On the other hand, if there is no translated code sequence, the translator may translate one or more non-native instructions from the non-native code sequence into native instructions in a translated code sequence (block 1034).

Generally, the translator may translate each non-native instruction into one or more native instructions which, when executed, may perform the same operation on the non-native architected state that the non-native instruction would have performed. The translator may generally perform the same decoding of instructions as is performed by the interpreter (block 1002 in FIG. 12) to determine what operations may need to be performed. For example, if the native processor architecture is a load/store architecture in which memory operands are accessed using explicit load/store instructions and other instruction use only register operands, load and store instructions may be used to access the memory operands and other instructions may be used to perform the explicit operation of a non-native instruction having a memory operand. The translated instructions may make use of temporary registers to hold intermediate values corresponding to the execution of the non-native instruction. Additionally, the translated instructions may access the non-native architected state to retrieve operands and may update the non-native architected state with the final results of the non-native instruction. Generally, the native instructions corresponding to the non-native instruction may perform all of the operations defined for the instruction (e.g. blocks 1006, 1008, 1010, 1014, and 1016 in FIG. 12).

Once the translator has determined to terminate translation and save the translated sequence for execution, the translator may optionally optimize the translated code sequence (block 1036). The optimizations may include reordering the translated instructions for quicker execution, eliminating redundancies (e.g. redundant memory references, which may occur if multiple non-native instructions in the source code sequence accessed the same memory location), etc. Any suitable set of optimizations may be used. The resulting translated code sequence may then be stored into the translation cache. Additionally, the processor may branch to the translated code sequence and execute the sequence (block 1032).

It is noted that, while the above description may refer to accessing and/or updating non-native architected state, including various registers, the non-native architected state may be stored in any suitable fashion. For example, architected registers may actually be stored in memory locations, as highlighted above. The mapping of architected registers from the non-native processor architecture to memory locations may be used in either of the interpreter or the translator embodiments, or combinations thereof, to locate the non-architected state used during execution of the non-native instruction or affected by the execution of the non-native instruction. Thus, instructions which access the non-native architected state may perform memory reads/writes or register reads/writes, as the case may be.

Figure 14:
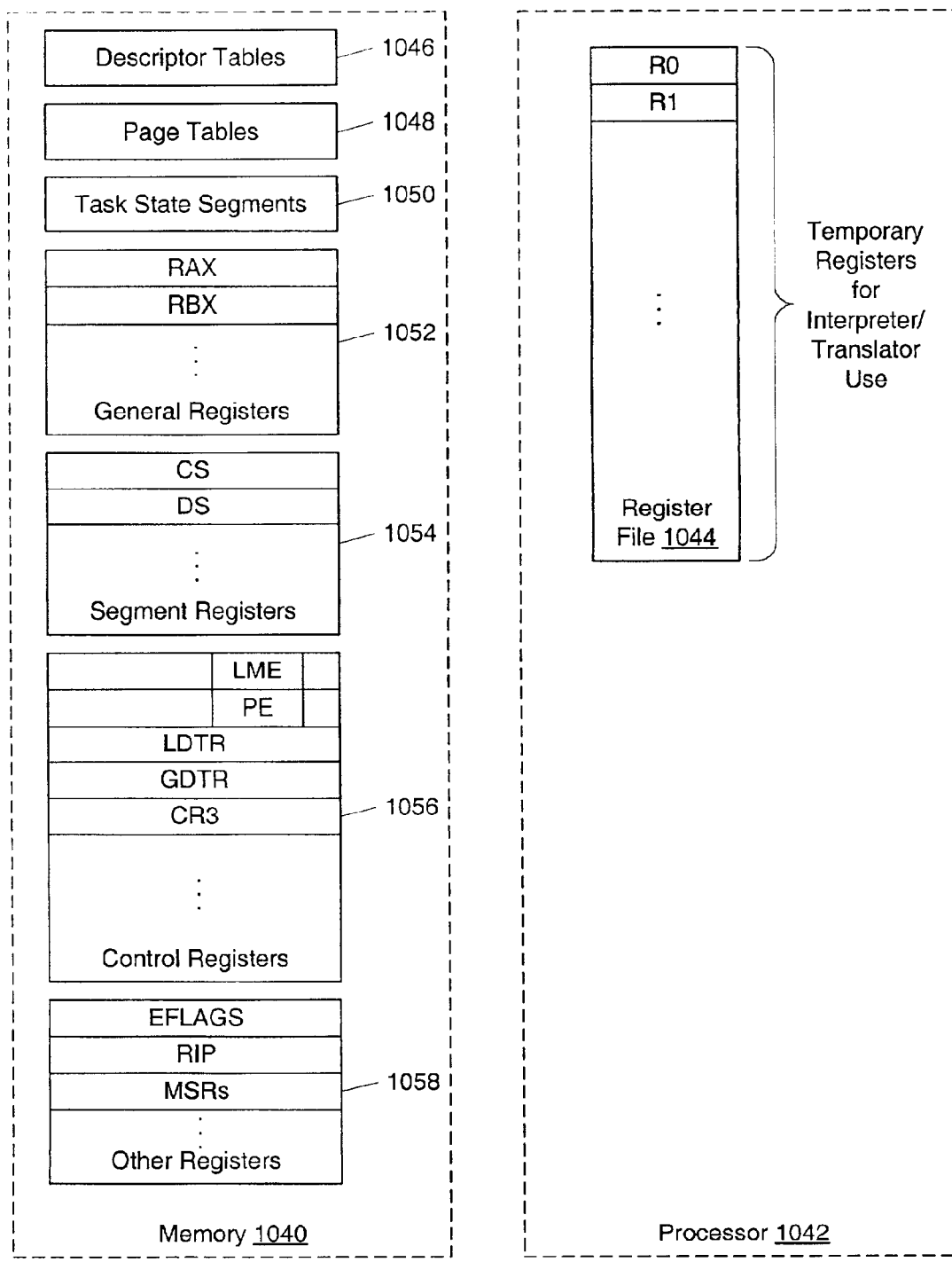
FIG. 14 is a block diagram illustrating one embodiment of mapping non-native architected state.

Turning next to FIG. 14, a block diagram illustrating one exemplary mapping of non-native architected state to either memory locations in a memory 1040 or to processor resources in a native processor 1042. Native processor 1042 includes a register file 1044 including the architected general registers of the native processor architecture. Any number of registers may be provided.

In the embodiment of FIG. 14, all of the non-native architected state is mapped to memory 1040. For example, descriptor tables 1046 (which may include a global descriptor table, a local descriptor table, and an interrupt descriptor table), page tables 1048 (which store virtual to physical address translations), task state segments 1050, general registers 1052, segment registers 1054, control registers 1056, and other registers 1058 may represent non-native architected state.

Thus, in the embodiment of FIG. 14, to access any non-native architected state, a memory access may be performed. For example, if a non-native instruction has one of the general registers as an operand, the interpreter or translated native instruction performs a memory access to the memory location mapped to that general register to access or update that general register. The registers in register file 1044 may be used by the interpreter or translator as temporary registers to hold intermediate results or for other local interpreter/translator state.

General registers 1052 may include integer general registers (e.g. RAX, RBX, etc. as described above), floating point registers, and the Streaming Single Instruction, Multiple Data (SIMD) Extension (SSE) registers.

Segment registers 1054 may include storage locations corresponding to the segment registers 24 shown in FIG. 1 above.

Control registers 1056 may include storage locations corresponding to various control registers defined in the non-native processor architecture. For example, control registers storing the LME and PE bits, as well as the LDTR and GDTR registers and the CR3 register (which stores the base address of the page tables 1048) are shown. Other control registers may be included as well.

Other registers 1058 includes any remaining architected registers. For example, the EFLAGS register (which stores condition code information), the instruction pointer (RIP) register (which stores the address of the instruction to be executed), and the model specific registers (MSRs) may be included in other registers 1058.

Figure 15:
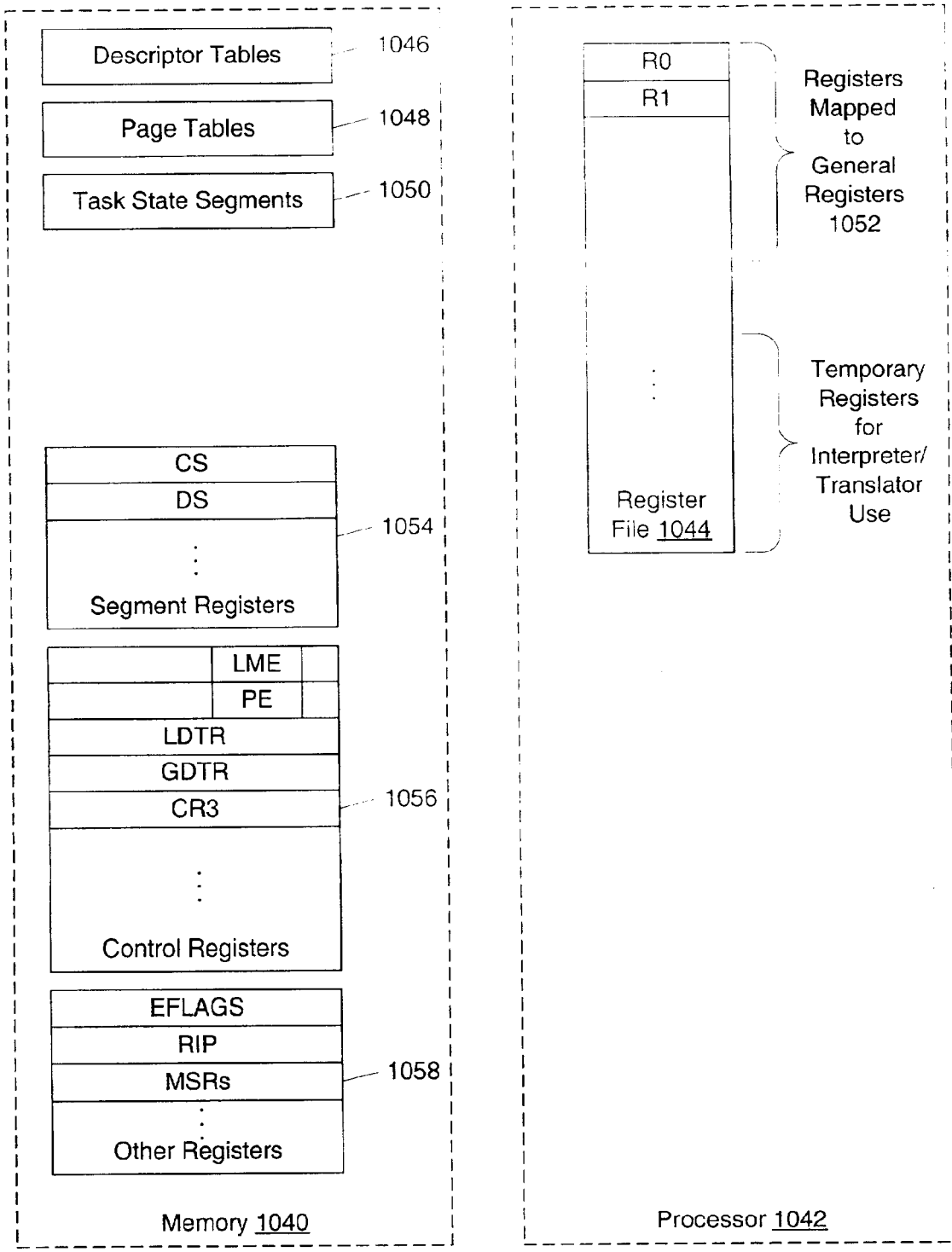
FIG. 15 is a block diagram illustrating a second embodiment of mapping normative architected state.

While the example of FIG. 14 maps all of the non-native architected state to memory 1040, other embodiments may implement other mappings. In FIG. 15, for example, some of the general registers in register file 1044 are mapped to the general registers 1052. Accordingly, if a non-native instruction has a general register as an operand, the interpreter accesses the corresponding register in register file 1044. Similarly, the translator generates a translated instruction having the corresponding register in register file 1044 as an operand. Other architected state may still be accessed via memory operations in the embodiment of FIG. 15. Other registers in register file 1044 which are not assigned to non-native architected state may again be used as temporary registers for interpreter or translator use, as described above.

While the embodiment of FIG. 15 illustrates mapping the general registers 1052 to registers in register file 1044, any other non-native architected state may be mapped to registers in register file 1044. For example, any of segment registers 1054, control registers 1056, or other registers 1058 (or portions of any of these registers) may be mapped to register file 1044, as desired.

Figure 16:
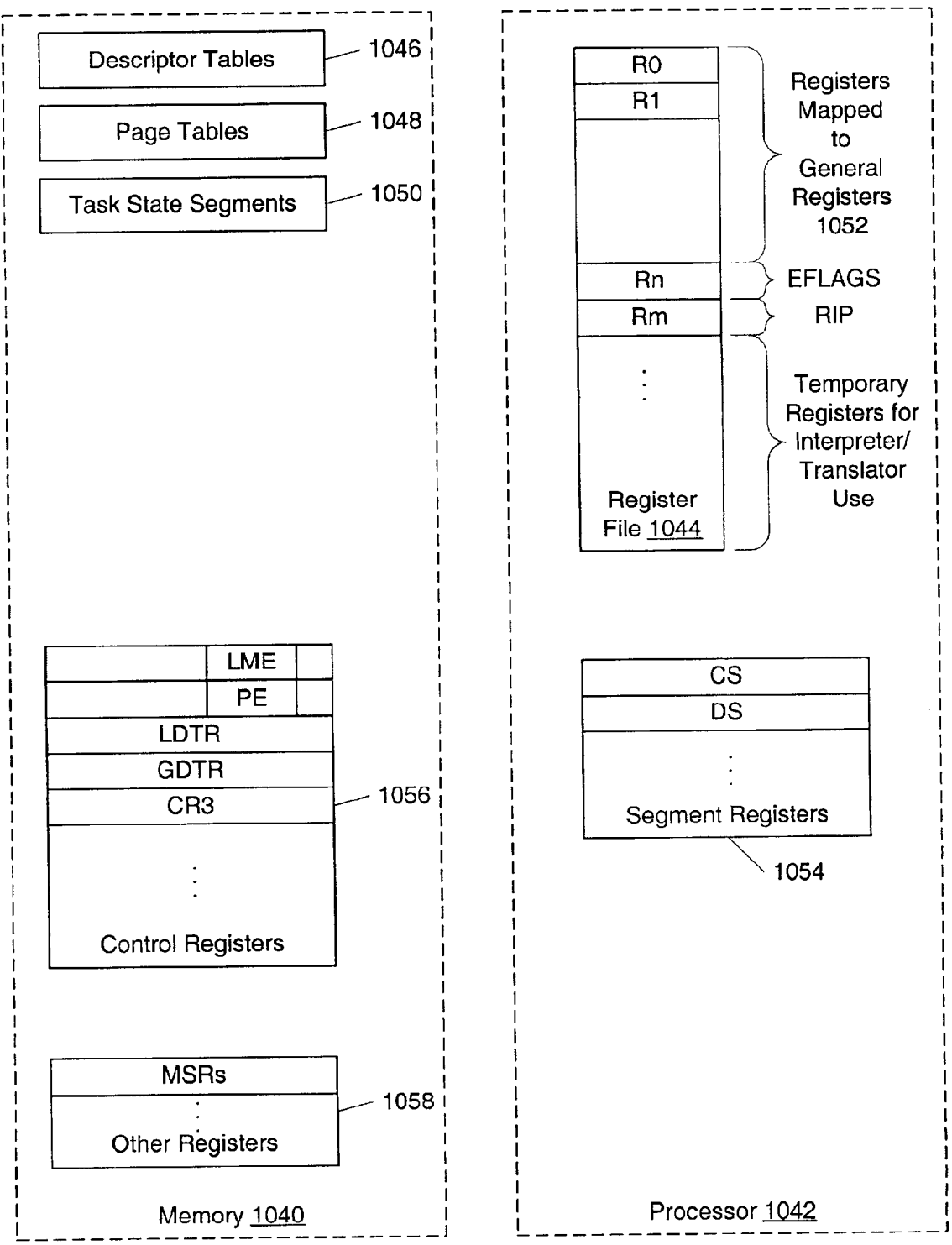
FIG. 16 is a block diagram illustrating a third embodiment of mapping non-native architected state.

FIG. 16 illustrates another example in which the general registers 1052 and the EFLAGS and RIP registers are mapped to registers in register file 1044. Additionally, in the example of FIG. 16, the segment registers 1054 are implemented in hardware in processor 1042. More specifically, processor 1042 may not only implement storage for segment registers 1054, but may also include logic to generate the operating mode for instructions based on the information in the segment registers. Furthermore, for compatibility modes, the logic may include limit checks and attribute checks to ensure that accesses to the segment attempted by the non-native instructions (or the non-native instructions in the interpreter or the translated code sequence which correspond to the non-native instructions) are permitted.

Similarly, other embodiments may implement various control registers 1056 or other registers 1058 in hardware, including corresponding logic to act on the contents of the registers as defined in the non-native architecture. Generally, various embodiments of processor 1042 may implement any non-native architected state in hardware. Certain architected state may generally be implemented in memory since the non-native processor architecture defines the state to be in memory (e.g. descriptor tables 1046, pages tables 1048, and task state segments 1050). Such memory-based architected state may be cached in caches within processor 1042 (e.g. TLBs for page table information, hidden segment register portions for segment descriptor information, etc.).

As the above discussion illustrates, the non-native architected state may be stored in any suitable storage location. Generally, a storage location is a location capable of storing a value. Suitable storage locations may include, in various embodiments, a memory location, a general register mapped to the non-native architected state, or a special purpose register (which may include additional hardware to interpret the contents of the register), depending upon the embodiment. Additionally, suitable storage locations could include a scratch pad RAM (such as a portion of a cache predetermined to be used as scratch pad RAM).

Figure 17:
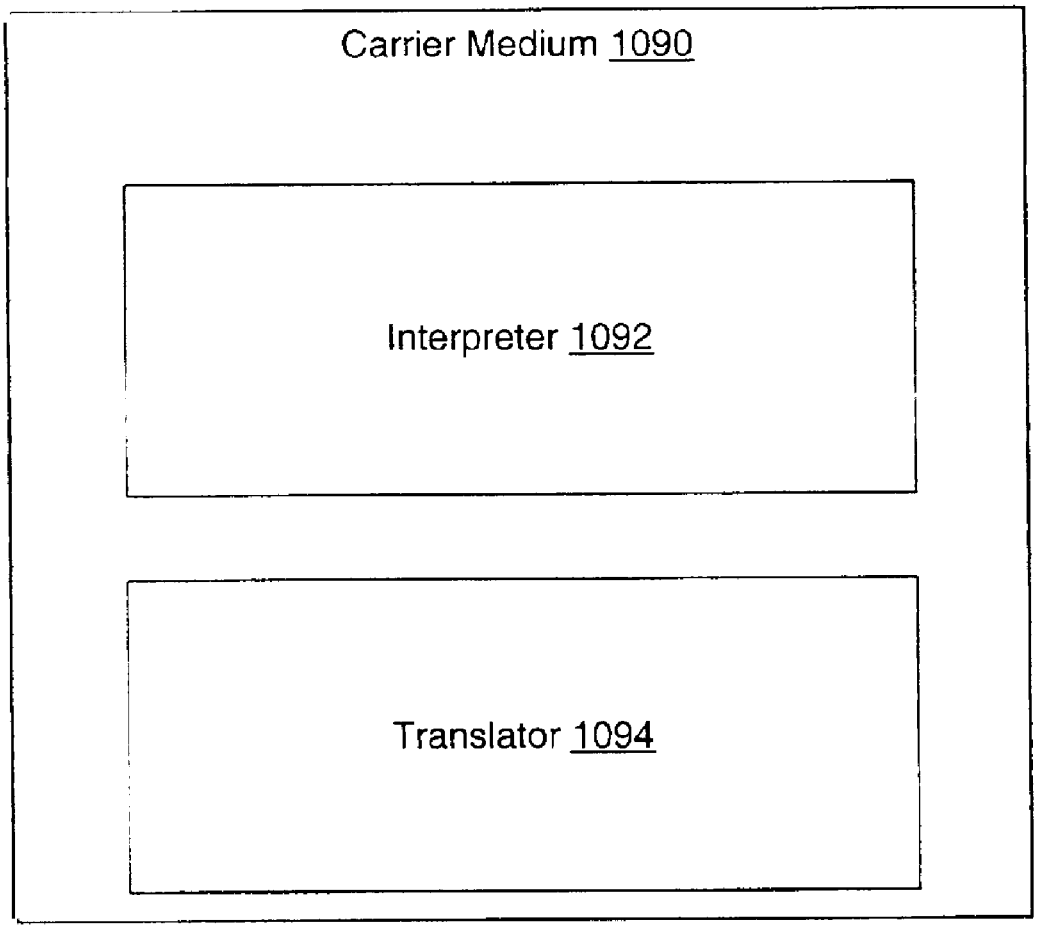
FIG. 17 is a block diagram of one embodiment of a carrier medium.

FIG. 17 is a block diagram of one embodiment of a carrier medium 1090. Other embodiments are possible and contemplated. In the embodiment of FIG. 17, carrier medium 1090 stores an interpreter program 1092 and a translator program 1094.

Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link. Carrier medium 1090 may thus be coupled to a computer system including processor 1042, may be part of a computer system including processor 1042, or may be a communication medium on which the computer system is capable of communicating. A computer system including processor 1042 may be of any suitable construction. For example, computer systems similar to those shown in FIGS. 10 and 11 may be used, with processor 1042 in place of processor 10.

Interpreter program 1090 may operate according to the flowchart of FIG. 12. Translator program 1094 may operate according to the flowchart of FIG. 13. Generally, interpreter program 1092 and translator program 1094 may each comprise code sequences including native instructions.

Numerous variations and modifications will become apparent to those skilled in the art once the above disclosure is fully appreciated. It is intended that the following claims be interpreted to embrace all such variations and modifications.

What is claimed is:

1. A processor comprising:
a register configured to store a first number of bits; and
an execution core coupled to said register, wherein said execution core is configured to execute an instruction to produce a result, said instruction having said register as a destination, and wherein said execution core is configured to zero extend said result for update in said register responsive to an operand size corresponding to said instruction specifying a second number of bits less than said first number of bits, and wherein said execution core is configured to preserve a value of at least a portion of said bits in said register that are not updated by said result responsive to said operand size specifying a third number of bits less than said first number of bits and different from said second number.

2. The processor as recited in claim 1 wherein said result comprises a number of bits specified by said operand size.

3. The processor as recited in claim 1 wherein said execution core is coupled to receive an operating mode of said processor, and wherein said execution core is configured to zero extend said result further responsive to said operating mode.

4. The processor as recited in claim 3 wherein said operating mode includes a default operand size, and wherein said operand size corresponding to said instruction is said default operand size unless overridden by an encoding of said instruction.

5. The processor as recited in claim 4 wherein said execution core is configured to zero extend said result if said operand size is said default operand size.

6. The processor as recited in claim 4 wherein said default operand size is overridden by said encoding if said instruction includes one or more operand size override prefixes.

7. A computer-implemented method-comprising:
executing an instruction to produce a result, said instruction having a register as a destination and said register configured to store a first number of bits;
zero extending said result for update in said register responsive to an operand size corresponding to said instruction specifying a second number of bits less than said first number of bits; and
preserving a value of at least a portion of said bits in said register that are not updated by said result responsive to said operand size specifying a third number of bits less than said first number of bits and different from said second number.

8. The method as recited in claim 7 wherein said result comprises a number of bits specified by said operand size.

9. The method as recited in claim 7 wherein said zero extending and said preserving are further responsive to an operating mode of a processor performing said executing.

10. The method as recited in claim 9 wherein said operating mode includes a default operand size, and the method further comprises zero extending said result if said operand size is said default operand size.

11. An apparatus comprising
a storage location corresponding to a register, said register defined to store a first number of bits; and
an execution circuit coupled to said storage location, wherein said execution circuit is configured to execute an instruction to produce a result, said instruction having said register as a destination, and wherein said execution core is configured to zero extend said result for update in said storage location responsive to an operand size corresponding to said instruction specifying a second number of bits less than said first number of bits, and wherein said execution circuit is configured to preserve a value of at least a portion of said bits in said storage location that are not updated by said result responsive to said operand size specifying a third number of bits less than said first number of bits and different from said second number.

12. The apparatus as recited in claim 11 wherein said result comprises a number of bits specified by said operand size.

13. The apparatus as recited in claim 11 wherein said execution circuit is coupled to receive an operating mode, and wherein said execution circuit is configured to zero extend said result further responsive to said operating mode.

14. The apparatus as recited in claim 13 wherein said operating mode includes a default operand size, and wherein said operand size corresponding to said instruction is said default operand size unless overridden by an encoding of said instruction.

15. The apparatus as recited in claim 14 wherein said execution circuit is configured to zero extend said result if said operand size is said default operand size.

16. The apparatus as recited in claim 14 wherein said default operand size is overridden by said encoding if said instruction includes one or more operand size override prefixes.

17. An apparatus comprising:
a storage location corresponding to a register, said register defined to store a first number of bits; and
an execution circuit coupled to said storage location, wherein said execution circuit is configured to execute an instruction to produce a result, said instruction having said register as a destination, and wherein said execution core is configured to extend said result to said first number of bits for update in said storage location responsive to an operand size corresponding to said instruction specifying a second number of bits less than said first number of bits, and wherein said execution circuit is configured to preserve a value of at least a portion of said bits in said storage location that are not updated by said result responsive to said operand size specifying a third number of bits less than said first number of bits and different from said second number.

18. The apparatus as recited in claim 17 wherein said result comprises a number of bits specified by said operand size.

19. The apparatus as recited in claim 17 wherein said execution circuit is coupled to receive an operating mode, and wherein said execution circuit is configured to selectively extend said result further responsive to said operating mode.

20. The apparatus as recited in claim 19 wherein said operating mode includes a default operand size, and wherein said operand size corresponding to said instruction is said default operand size unless overridden by an encoding of said instruction.

21. The apparatus as recited in claim 20 wherein said execution circuit is configured to extend said result to said first number of bits if said operand size is said default operand size.

22. The apparatus as recited in claim 20 wherein said default operand size is overridden by said encoding if said instruction includes one or more operand size override prefixes.

23. A computer system comprising:

a processor comprising a register configured to store a first number of bits and an execution core coupled to said register, wherein said execution core is configured to execute an instruction to produce a result, said instruction having said register as a destination, and wherein said execution core is configured to zero extend said result for update in said register responsive to an operand size corresponding to said instruction specifying a second number of bits less than said first number of bits, and wherein said execution core is configured to preserve a value of at least a portion of said bits in said register that are not updated by said result responsive to said operand size specifying a third number of bits less than said first number of bits and different from said second number; and an input/output (I/O) device configured to communicate between said computer system and another computer system.

24. The computer system as recited in claim 23 wherein the I/O device comprises a modem.

25. The computer system as recited in claim 23 further comprising an audio device.

26. A computer system comprising:

a processor comprising a register configured to store a first number of bits and an execution core coupled to said register, wherein said execution core is configured to execute an instruction to produce a result, said instruction having said register as a destination, and wherein said execution core is configured to extend said result to said first number of bits for update in said register responsive to an operand size corresponding to said instruction specifying a second number of bits less than said first number of bits, and wherein said execution core is configured to preserve a value of at least a portion of said bits in said register that are not updated by said result responsive to said operand size specifying a third number of bits less than said first number of bits and different from said second number; and an input/output (I/O) device configured to communicate between said computer system and another computer system.

27. The computer system as recited in claim 26 wherein the I/O device comprises a modem.

28. The computer system as recited in claim 26 further comprising an audio device.

* * * * *